(12) United States Patent
Aoyagi et al.

(10) Patent No.: US 10,190,725 B2
(45) Date of Patent: Jan. 29, 2019

(54) LOAD SUPPORT APPARATUS

(71) Applicants: Tatsuzo Aoyagi, Yamanashi-ken (JP);
Hiroto Akiyama, Yamanashi-ken (JP);
Toru Ochiai, Yamanashi-ken (JP);
Misao Kobayashi, Yamanashi-ken (JP)

(72) Inventors: Tatsuzo Aoyagi, Yamanashi-ken (JP);
Hiroto Akiyama, Yamanashi-ken (JP);
Toru Ochiai, Yamanashi-ken (JP);
Misao Kobayashi, Yamanashi-ken (JP)

(73) Assignee: CANON FINETECH NISCA INC.,
Misato-Shi, Saitama (JP)

( * ) Notice: Subject to any disclaimer, the term of this patent is extended or adjusted under 35 U.S.C. 154(b) by 0 days.

(21) Appl. No.: 14/716,177

(22) Filed: May 19, 2015

(65) Prior Publication Data

US 2015/0330557 A1     Nov. 19, 2015

(30) Foreign Application Priority Data

May 19, 2014    (JP) .................................. 2014-103704

(51) Int. Cl.
*F16M 11/42*    (2006.01)
*F16M 11/04*    (2006.01)
(Continued)

(52) U.S. Cl.
CPC ........... *F16M 11/42* (2013.01); *F16M 11/046* (2013.01); *F16M 11/18* (2013.01);
(Continued)

(58) Field of Classification Search
CPC .... F16M 11/04; F16M 11/24; F16M 2200/04; F16M 2200/048; F16M 11/046;
(Continued)

(56) References Cited

U.S. PATENT DOCUMENTS 2,413,342 A * 12/1946 Symons ................ E04G 25/066
248/354.5
2,963,127 A * 12/1960 Manville .................. E04B 2/56
248/188.91
(Continued)

FOREIGN PATENT DOCUMENTS

JP      S61-145222 U    9/1986
JP      S61-170440 U    10/1986
(Continued)

OTHER PUBLICATIONS

Japan Patent Office, "Office Action for Japanese Patent Application No. 2014-103704," dated Feb. 16, 2018.

*Primary Examiner* — Jonathan Liu
*Assistant Examiner* — Taylor L Morris
(74) *Attorney, Agent, or Firm* — Manabu Kanesaka

(57) ABSTRACT

The present load support apparatus comprises an object support apparatus 10 includes a regulating device 60 that regulates movement of a support frame unit 13 with respect to a fixed frame unit 12. The regulating device includes a fixed-side slit 62 that is formed at a side frame 18, 19 of the fixed frame unit, a movable-side slit 63 that is formed at a guide frame 28, 29 of the support frame unit, and a regulating member 61 that is inserted through the slits. The regulating member is engaged with a movable-side engaging portion 71 at the movable-side slit and a fixed-side engaging portion 72 at the fixed-side slit and the regulating member is locked between the fixed-side engaging portion and the movable-side engaging portion.

5 Claims, 25 Drawing Sheets

(51) Int. Cl.
*F16M 11/22* (2006.01)
*F16M 11/18* (2006.01)
*F16B 21/12* (2006.01)
*F16B 7/10* (2006.01)

(52) U.S. Cl.
CPC .............. *F16M 11/22* (2013.01); *F16B 7/105* (2013.01); *F16B 21/12* (2013.01); *F16M 2200/027* (2013.01); *F16M 2200/028* (2013.01); *F16M 2200/047* (2013.01)

(58) Field of Classification Search
CPC ........ F16M 11/28; F16M 11/18; F16M 11/42; F16M 2200/028; F16M 2200/027; F16B 7/105; F16B 7/1427; F16B 21/12; B66F 13/00; B66F 3/24; B66F 3/30; B66F 1/06; B66F 3/12; B66F 1/04; G02B 7/001; A47B 9/02; A47B 2097/006; A47B 2200/04
USPC .......... 248/123.11, 123.2, 125.1, 125.2, 161, 248/162.1, 176.1, 176.3, 274.1, 295.11, 248/297.1, 364, 404, 351, 352, 354.4, 248/354.6, 354.7, 407, 354.1, 188.5, 248/354.5; 108/37, 147.19; 403/107, 403/109.1; 254/1, 2 B, 8 B, 11, 89 H, 254/93 R, 108, 131, 133 R, 134
See application file for complete search history.

(56) References Cited

U.S. PATENT DOCUMENTS

| | | | | |
|---|---|---|---|---|
| 3,027,209 A * | 3/1962 | Nielsen | .................. | A47B 91/02 108/146 |
| 3,285,208 A * | 11/1966 | Cohen | .................... | F16B 7/105 108/108 |
| 3,523,702 A * | 8/1970 | Unti | .......................... | A47B 9/14 108/106 |
| 3,704,850 A * | 12/1972 | Hendrickson | ............ | A47B 9/20 248/188.5 |
| 3,802,658 A * | 4/1974 | Binding | .................... | B66F 1/04 248/352 |
| 3,856,253 A * | 12/1974 | Seebinger | ............. | F16B 7/1481 248/411 |
| 4,042,202 A * | 8/1977 | Molinari | ................. | B66F 13/00 248/352 |
| 4,505,455 A * | 3/1985 | Beatty | ...................... | B66F 7/04 254/89 H |
| 4,531,614 A * | 7/1985 | Naegeli | ..................... | B66F 7/04 187/208 |
| 4,842,311 A * | 6/1989 | White | ..................... | F16B 7/105 248/408 |
| 5,281,045 A * | 1/1994 | Ichikawa | ................ | F16B 7/105 403/108 |
| 5,456,191 A * | 10/1995 | Hall | ......................... | A47B 9/02 108/147 |
| 5,520,360 A * | 5/1996 | Wensman | ............ | F16M 11/046 248/188.5 |
| 5,711,512 A * | 1/1998 | Kauffman | ................. | B66F 3/38 254/129 |
| 6,026,755 A * | 2/2000 | Long | ......................... | A47B 9/02 108/147 |
| 6,189,849 B1 * | 2/2001 | Sweere | .............. | A47B 21/0314 248/286.1 |
| 6,347,777 B1 * | 2/2002 | Webber | ................... | A47C 7/402 248/188.5 |
| 6,905,099 B2 * | 6/2005 | Sung | ...................... | F16M 11/04 248/146 |
| 6,994,306 B1 | 2/2006 | Sweere et al. | | |
| 7,032,870 B2 | 4/2006 | Sweere et al. | | |
| 7,581,713 B1 * | 9/2009 | Voss | ......................... | B66F 3/25 254/2 B |
| 7,708,243 B2 * | 5/2010 | Wang | ..................... | F16M 11/04 248/149 |
| 7,722,003 B2 * | 5/2010 | Ishizaki | ................ | F16M 11/105 248/125.1 |
| 8,016,257 B2 * | 9/2011 | Di Biase | .................. | B60D 1/66 248/157 |
| 8,047,480 B2 * | 11/2011 | Lien | ....................... | F16M 11/04 248/162.1 |
| 8,056,870 B2 * | 11/2011 | Chih | ...................... | F16M 11/24 248/157 |
| 8,056,877 B2 * | 11/2011 | Wang | ..................... | F16M 11/04 248/157 |
| 8,152,144 B2 * | 4/2012 | Wisse | .................. | F16M 11/046 267/136 |
| 8,201,807 B2 * | 6/2012 | Hernandez, Jr. | .......... | B66F 3/30 254/133 R |
| 9,169,960 B2 * | 10/2015 | Hakansson | ............ | F16M 11/18 |
| 2005/0224769 A1 * | 10/2005 | Climenhaga | ............. | B66F 7/18 254/1 |
| 2007/0252067 A1 * | 11/2007 | Lee | ......................... | F16B 7/105 248/407 |
| 2007/0264076 A1 * | 11/2007 | McCracken | .......... | E04G 25/061 403/315 |
| 2009/0095856 A1 * | 4/2009 | Nakatani | ................. | F16B 7/042 248/177.1 |
| 2010/0320430 A1 | 12/2010 | Wisse et al. | | |
| 2015/0001355 A1 * | 1/2015 | Huang | ................. | F16M 11/046 248/123.11 |
| 2015/0102200 A1 * | 4/2015 | Aoyagi | ................ | F16M 11/046 248/610 |
| 2015/0308612 A1 * | 10/2015 | Chen | ....................... | F16M 11/28 248/352 |

FOREIGN PATENT DOCUMENTS

JP S63-100492 U 6/1988
JP 2010-110539 A 5/2010

* cited by examiner

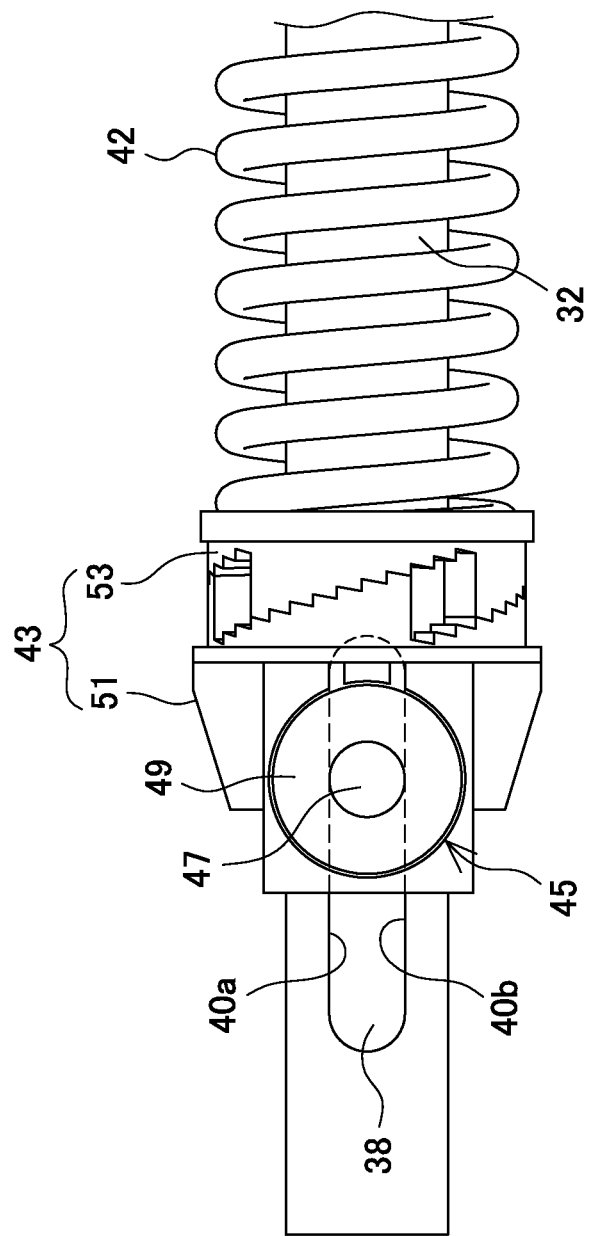

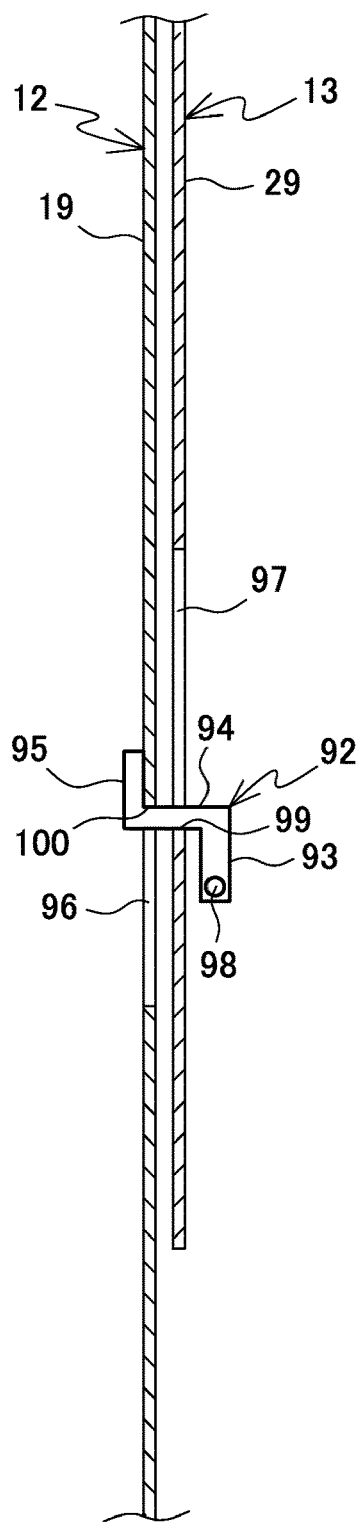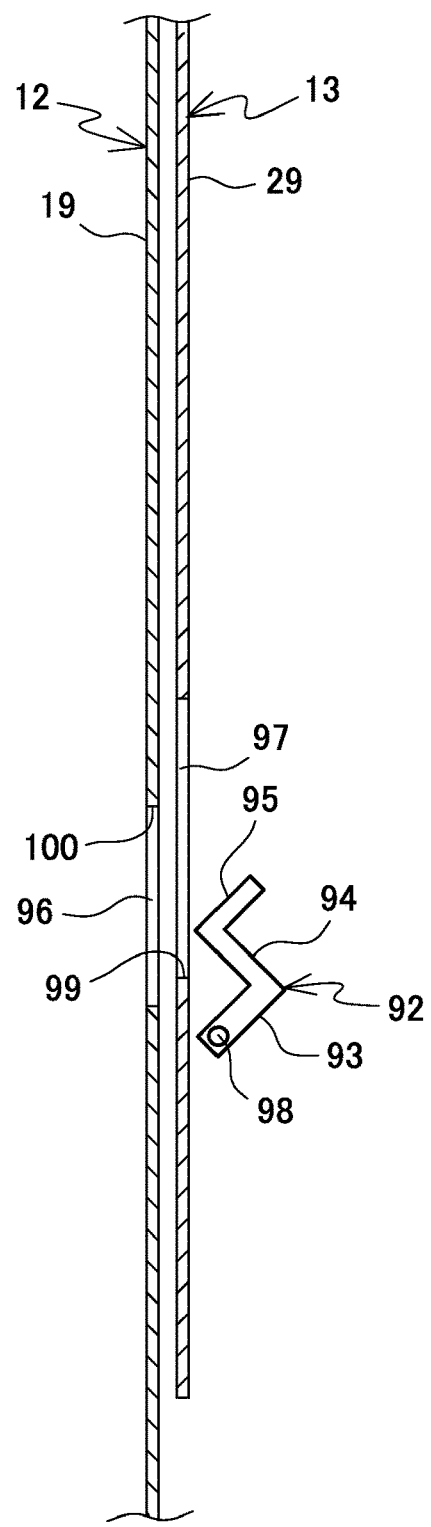

FIG. 22A
FIG. 22B
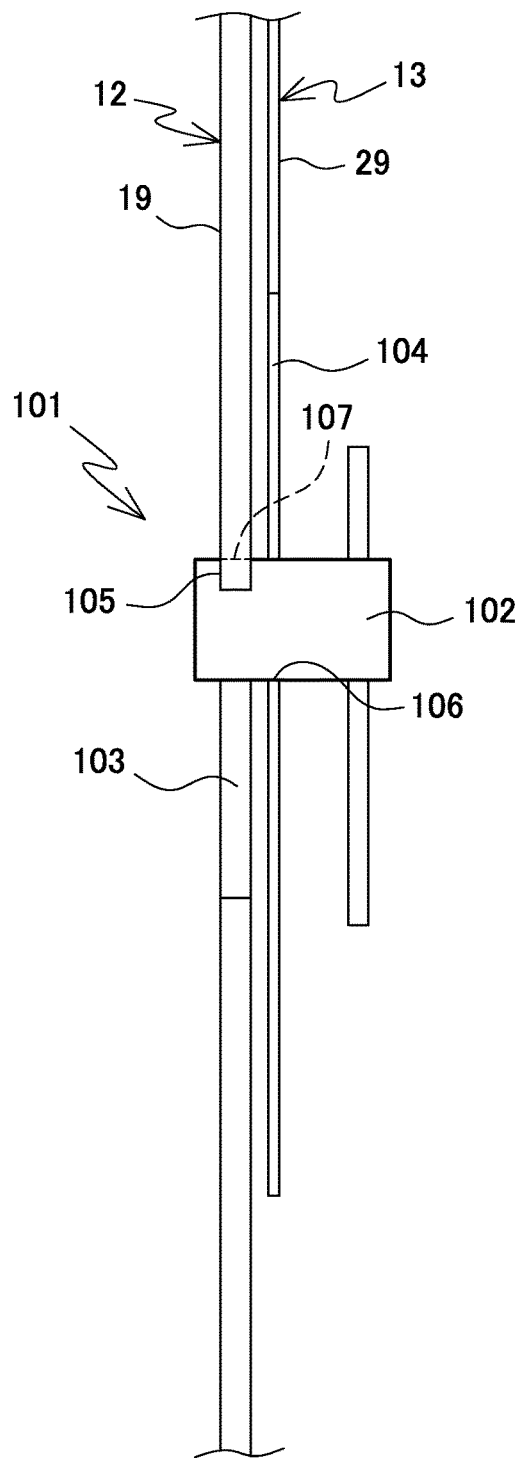
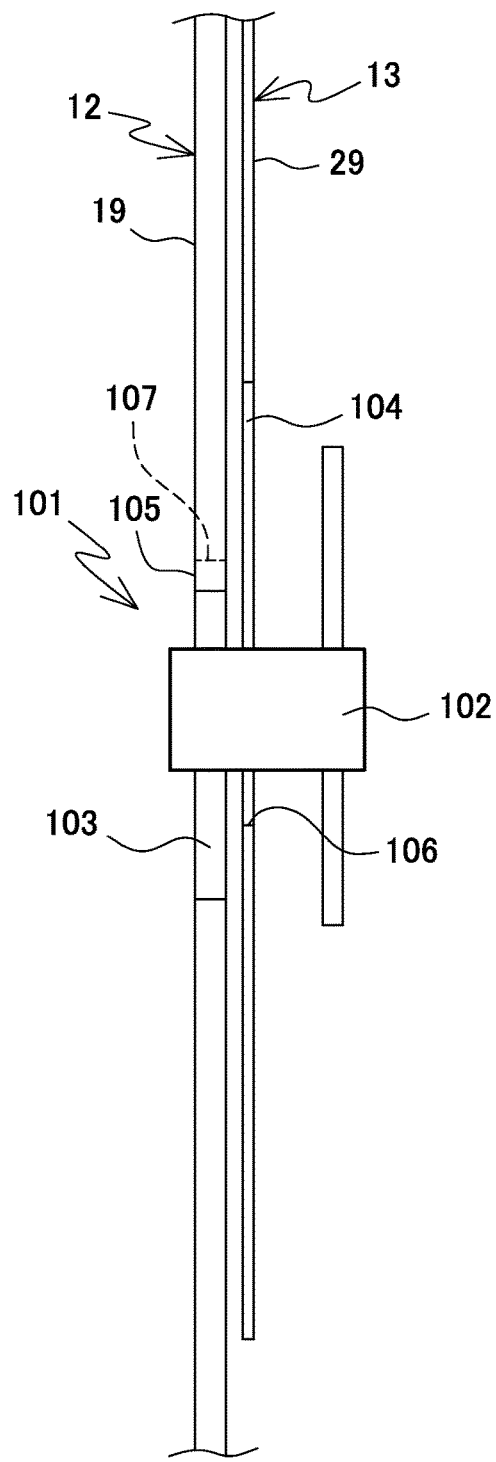

FIG. 23A
FIG. 23B
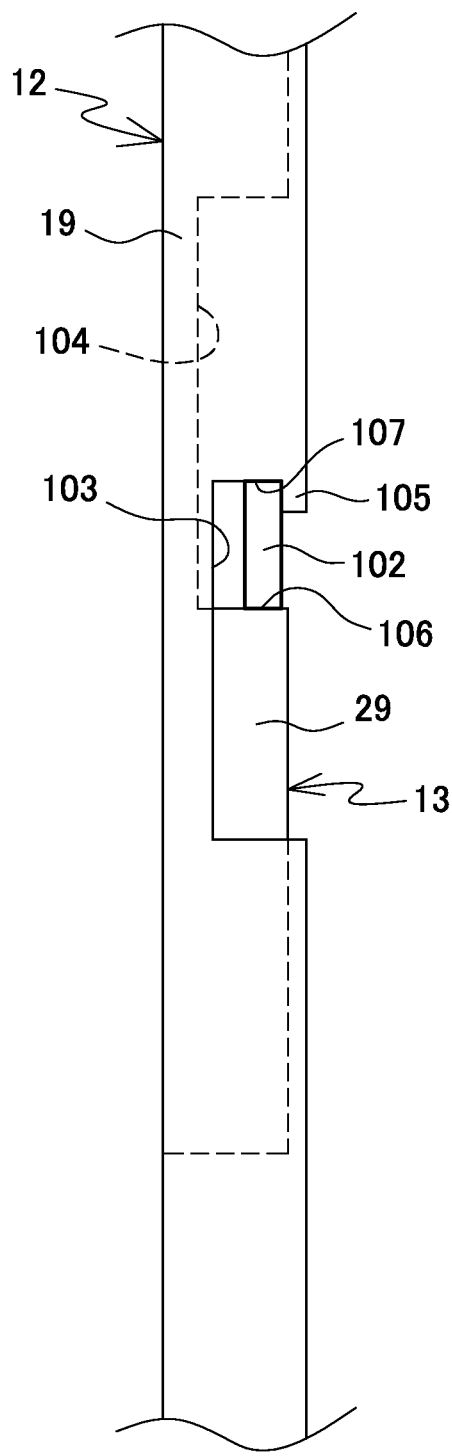
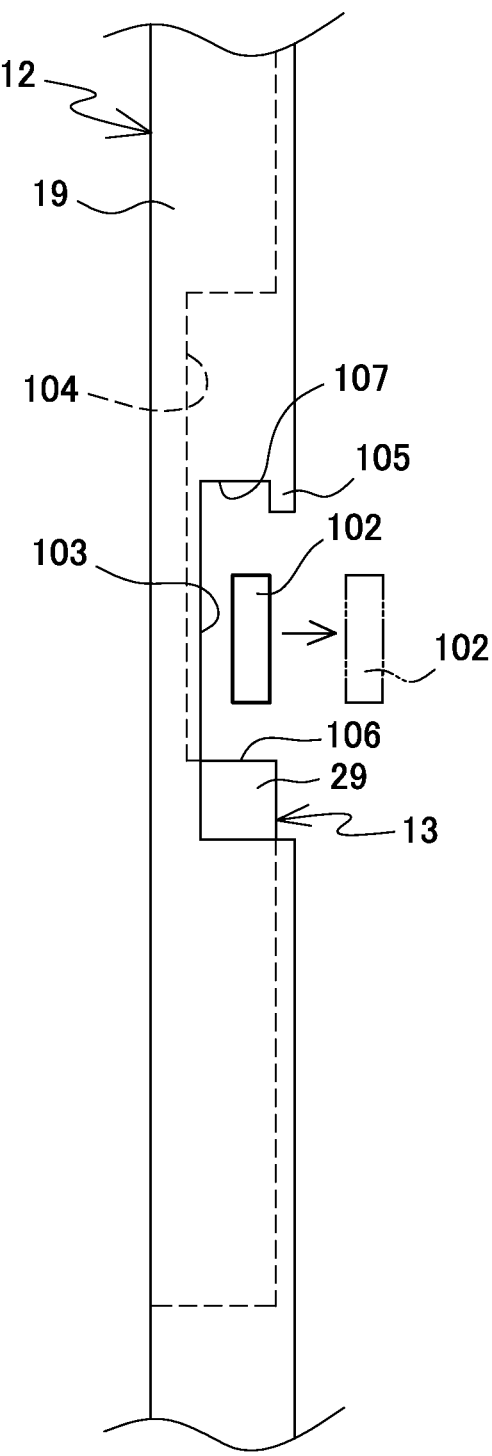

LOAD SUPPORT APPARATUS

BACKGROUND OF THE INVENTION

1. Field of the Invention

The present invention relates to a load support apparatus that movably supports a load of an object or the like at a desired position, for example.

2. Description of Related Arts

Conventionally, there have been proposed a variety of support mechanisms for supporting an object such as a monitor device of a computer or a television, a top board of an office table or an operational table, and heavy goods at a desired height position in a manner capable of lifting and lowering. For example, there has been known a monitor device support mechanism capable of moving a monitor device up and down and positioning the monitor device at a given position (for example, see Japanese Patent Application Laid-open 2002-303304).

According to a monitor device support mechanism disclosed in Japanese Patent Application Laid-open 2002-303304, a moving body being an upper structure to which a monitor device is attached is guided and held by a side face of a lower structure in a manner capable of being lifted and lowered. A spring force in the horizontal direction is converted into an approximately constant support force in the vertical direction by a cam that is arranged at the lower structure and a cam follower member that is continuously urged to the cam with a spring. Thus, the monitor device is held with the position thereof adjusted.

According to disclosure of Japanese Patent Application Laid-open 2002-303304, to keep balance between the spring and the monitor device on the moving body, the cam is formed to have a cam shape so that the spring force provides a constant balancing force in the movement direction of the monitor device regardless of positions of the cam follower member. Accordingly, the upper structure, that is, the monitor device, can be moved in a long-distance range.

SUMMARY OF THE INVENTION

In the conventional monitor device support mechanism described above, the urging force of the spring continuously urges the cam follower member with respect to the cam to be exerted in a direction to upwardly support the upper structure capable of being lifted and lowered. Accordingly, in a no-load state that the monitor device is not attached thereto, the upper structure is always pushed up to the uppermost position. When a downward external force is applied in this state, there is a fear that the upper structure is lowered depending on the magnitude of the external force. Therefore, sufficient attention must be devoted for treatment such as transporting and storing.

In particular, when a heavy monitor device is to be attached to the upper structure in the above state, the monitor device is required to be lifted to the uppermost position. It is extremely troublesome and extremely inefficient in operability. There may be a fear that fine adjustment is difficult to be performed and that, in some cases, a risk of dropping and the like is caused. Further, on attaching of the monitor device, the upper structure becomes in a state capable of being lifted and lowered easily as being balanced with the support force of the spring. Accordingly, there is a fear that the monitor device is carelessly lifted and lowered during attaching operation with an action of an eternal force and the like. It is extremely difficult and troublesome to perform adjustment operation in such a state.

In view of the above, an object of the present invention is to provide a load support apparatus including a fixed support unit, a movable support unit for receiving a load as being movable with respect to the fixed support unit, and an urging device that urges the movable support unit to support the load, the load support apparatus being provided with a regulating device that locks movement of the movable support unit with respect to the fixed support unit at an arbitrary height position even in a no-load state that a load is not attached.

Further, an object of the present invention is to arrange a regulating device, in such a load support apparatus, that does not require a separate device or a specially robust structure for burdening a large load especially when supporting a heavy object or the like.

A load support apparatus according to an aspect of the present invention includes a fixed support unit; a movable support unit for receiving a load as being movable with respect to the fixed support unit; an urging device that continuously urges the movable support unit to support the load; and a regulating device that regulates movement of the movable support unit with respect to the fixed support unit as including a fixed-side engaging portion at the fixed support unit side, a movable-side engaging portion at the movable support unit side, and a regulating member that is arranged in a detachably insertable manner between the fixed-side engaging portion and the movable-side engaging portion. Here, in a state that the load is not supported by the movable support unit, the regulating member is engaged with the movable-side engaging portion and engaged with the fixed-side engaging portion with an urging force of the urging device and the regulating member is locked between the fixed-side engaging portion and the movable-side engaging portion with the urging force received from the movable-side engaging portion and a reaction force received from the fixed-side engaging portion.

According to the regulating device that utilizes the urging force of the urging device to support the load as described above, the movable support unit can be locked not to be easily released with respect to the fixed support unit even in a no-load state that a load is not attached. Accordingly, operability is drastically improved in load attaching, balance adjusting, and the like. Further, since the movable support unit is locked by directly using the urging force of the urging device, it is advantageous that, even when a load is attached, a separate device or a special structure is not required to be arranged for burdening the load.

In an embodiment, the regulating member includes a first projection that is engaged with the fixed support unit and/or the movable support unit in a pull-out direction of the regulating member in a state of being locked between the fixed-side engaging portion and the movable-side engaging portion. Owing to arranging the first projection as described above, the regulating member in a locked state can be effectively prevented from being detached.

In another embodiment, the regulating member includes a second projection that is engaged with the fixed support unit and/or the movable support unit in a direction in which the regulating member is to be rotated with the urging force received from the movable-side engaging portion and the reaction force received from the fixed-side engaging portion. Owing to arranging the second projection as described above, rotation of the engaging member in the locked state can be effectively prevented.

In another embodiment, the first projection and the second projection of the regulating member are arranged in common. Accordingly, the structure of the regulating device can be simplified.

In another embodiment, the movable support unit is movable against the urging force in a direction to release locking between the regulating member and the movable-side engaging portion. Accordingly, it is possible, when a load is attached to the movable support unit, to safely adjust an attaching state thereof and a balancing state with the urging device.

A load support apparatus of another aspect of the present invention includes a fixed support unit; a movable support unit for receiving a load as being movable with respect to the fixed support unit in a predetermined range along a predetermined direction; a fixed cam that is arranged at the fixed support unit as having a fixed cam face; a cam groove that is arranged at the movable support unit and extended in a direction intersecting with a movement direction of the movable support unit as having a first movable cam face and a second movable cam face opposed to each other; a cam follower that is movable in the cam groove along the cam groove as being contacted to the first cam face or the second cam face; a first spring that is arranged between the fixed support unit and the movable support unit so as to support the load; a second spring that urges the cam follower to the fixed cam face; and a regulating device that regulates movement of the movable support unit with respect to the fixed support unit. Here, a reaction force from the fixed cam face to the cam follower includes a component in a first direction along movement direction of the movable support unit and a component in a second direction at least perpendicular to the movement direction of the movable support unit, the components occurring depending on a position in the predetermined range where the movable support unit is movable. Further, the fixed cam face has a cam shape so that the load, an urging force of the first spring, a reaction force from the fixed cam face to the cam follower, and an urging force of the second spring are balanced around the cam follower in the predetermined range where the movable support unit is movable. Further, the regulating device includes a fixed-side engaging portion at the fixed support unit side, a movable-side engaging portion at the movable support unit side, and a regulating member that is arranged detachably insertable manner between the fixed-side engaging portion and the movable-side engaging portion. Furthermore, in a state that the load is not supported by the movable support unit, the regulating member is engaged with the movable-side engaging portion and engaged with the fixed-side engaging portion with the urging force of the first spring and the regulating member is locked between the fixed-side engaging portion and the movable-side engaging portion with the urging force received from the movable-side engaging portion and a reaction force received from the fixed-side engaging portion.

According to the load support apparatus having the abovementioned structure, when the forces exerted around the cam follower are in a balanced state, the load, the urging force of the first spring, and the component in the first direction of the reaction force from the fixed cam face are balanced in movement direction of the movable support unit. Accordingly, the movable support unit can be held in a state that the load is supported at a desired position without utilizing another structural element or an external force.

Here, in the present specification, the balanced state denotes a state, when several forces are exerted to an object or member (for example, the cam follower), that the resultant force thereof is zero, causing the object or member to remain as a result. In the above, in addition to its own load of the object or member, that is, own weight, the external force exerted to the object or member includes a frictional force occurring between the object or member and another object or member, a frictional force and a resistance occurring at another object or member that causes the external force to be exerted on the object or member, and the like. In actual use, in a case that the frictional force and the like are equal to or larger than a resultant force that is obtained when weights of the object or member and the other object or member are applied to the forces exerted around the cam follower, the frictional force and the like can serve as a force to hold the object or member at a stop position.

In the abovementioned load support apparatus as well, owing to that the abovementioned regulating device that utilizes the urging force of the first spring is arranged, the movable support unit can be locked not to be easily released with respect to the fixed support unit even in a no-load state that a load in not attached. In particular, for attaching a load, operability is drastically improved in the operation to adjust balance between the load and the support force of the load support apparatus.

BRIEF DESCRIPTION OF THE DRAWINGS

FIG. 4B is an arrow view at line IV-IV in FIG. 4A as eliminating a fixed cam member, FIGS. 21A and 21B are cross-sectional views, being similar to FIGS. 16 and 17, illustrating a third modified example of the regulating member, FIGS. 22A and 22B are cross-sectional views, being similar to FIGS. 16 and 17, illustrating a first modified example of the regulating device, FIGS. 23A and 23B are views of the first modified example of the regulating device viewing from the rear face side of the fixed frame unit in correspondence with FIGS. 22A and 22B.

DETAILED DESCRIPTION OF THE PREFERRED EMBODIMENT

In the following, preferable embodiments of the present invention will be described in detail with reference to the attached drawings. In the attached drawings, the same reference is given to the similar structural element in the entire specification.

Figure 1:
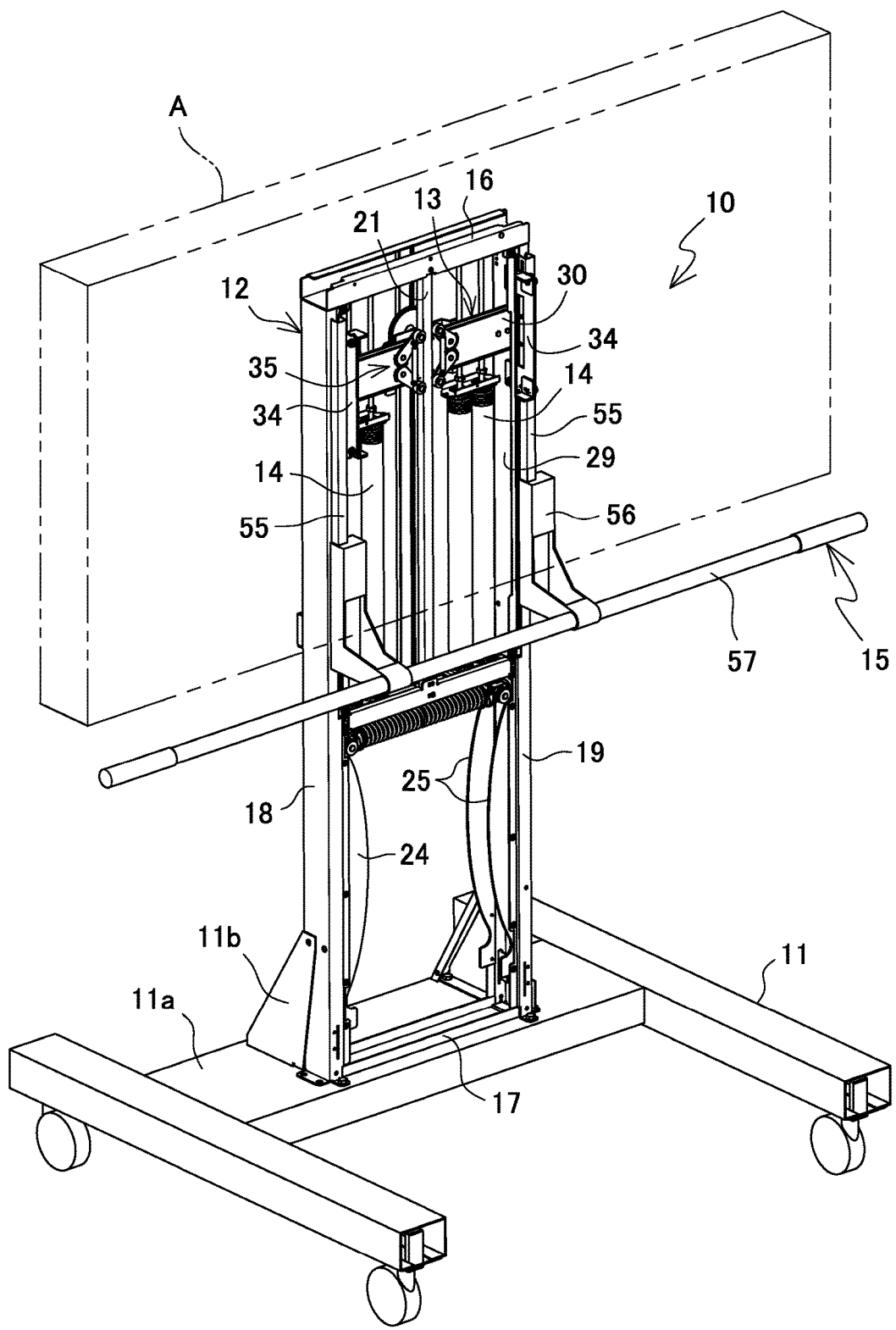
FIG. 1 is a perspective view of an object support apparatus of an embodiment of the present invention viewing from a front face side.
Figure 2:
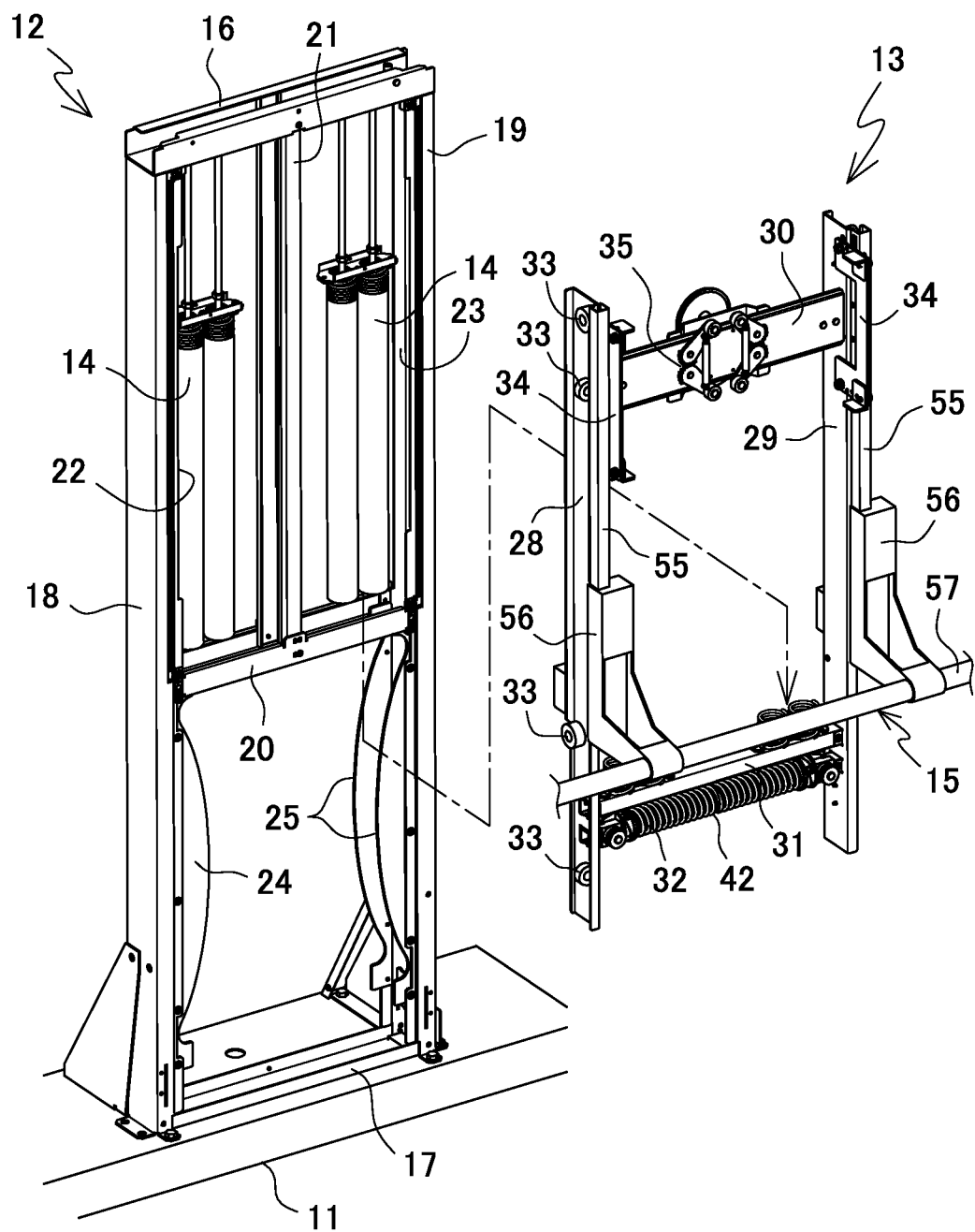
FIG. 2 is an exploded perspective view of the object support apparatus in FIG. 1.
Figure 3:
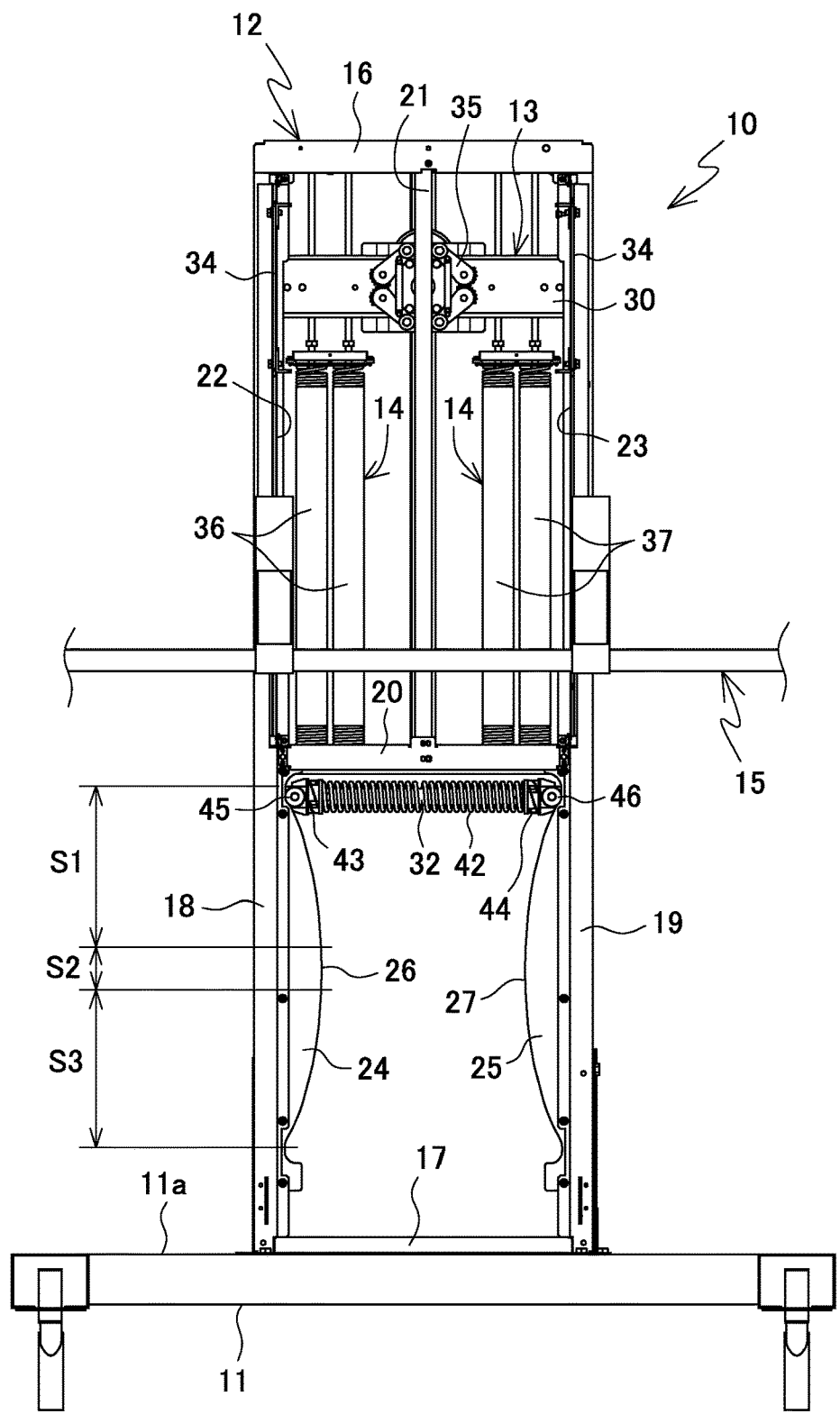
FIG. 3 is a front view of the object support apparatus in which a support frame unit is located at the uppermost position.

FIGS. 1 to 3 schematically illustrate a preferable embodiment of an object support apparatus to which the present invention is applied. An object support apparatus 10 of the present embodiment supports an object A having relatively large weight such as a large-screen television monitor. The object support apparatus 10 includes a base 11 that is movably installed on a floor or the like, a fixed frame unit 12 that is fixed to the base 11, a support frame unit 13 that is attached to the fixed frame unit 12 in a manner capable of being lifted and lowered, a first spring 14, and an operational handle portion 15 to perform an operation to lift and lower the support frame unit 13.

An object A is integrally attached to the support frame unit 13 in a detachably attachable manner as described later. The fixed frame unit 12 is raised and fixed firmly at a lower part thereof with a stay 11b on an upper face of a base plate 11a of the base 11.

The fixed frame unit 12 has an approximately rectangular frame structure. The fixed frame unit 12 includes an upper frame 16 and a lower frame 17 that extend horizontally, and right-left side frames 18, 19 that extend vertically between the upper frame 16 and the lower frame 17. Further, at the center of the fixed frame unit 12, there is provided a first brake rail 21 that extends vertically between the upper frame 16 and an intermediate frame 20 extending horizontally at an approximately intermediate height between the right-left side frames 18, 19.

Figure 4A:
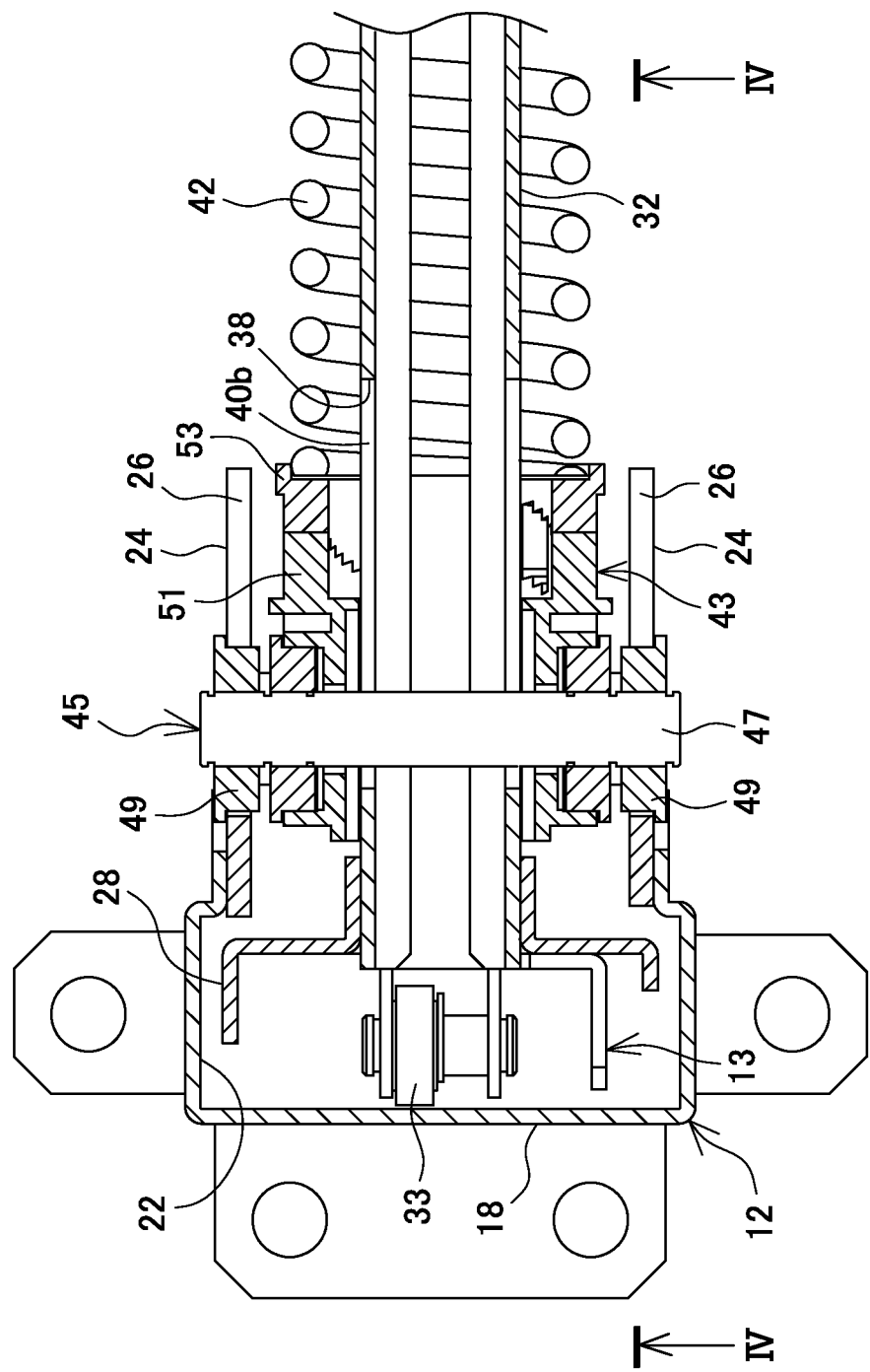
FIG. 4A is a partially-enlarged vertical cross-sectional view viewing one cam follower member from the above.

FIG. 4A illustrates a cross-section of the side frame 18 at one side of the fixed frame unit 12. Since the side frame 19 at the other side is structured as being completely symmetric with the side frame 18, illustration thereof is omitted. As illustrated in FIG. 4A, a guide rail 22, 23 having a U-shaped cross-section as being open to the inside of the frame structure is formed at the side frame 18, 19 approximately from the upper end to the lower end of the side frame 18, 19.

Fixed cam members 24, 25 are attached in a bilaterally symmetric manner to the right-left side frames 18, 19 of the fixed frame unit 12 at the inside at a lower part from the intermediate frame 20. Each of the fixed cam members 24, 25 includes two vertically-elongated cam plates that are fixed in parallel to each other at front-rear faces of the side frames 18, 19. The fixed cam member 24, 25 includes a fixed cam face 26, 27 extending approximately from the upper end to the lower end thereof. The fixed cam faces 26, 27 are formed in a convex manner as being opposed to each other to be curved with inclination thereof in the tangential direction varied partially or entirely from the upper end to the lower end.

The support frame unit 13 has an approximately rectangular frame structure. The support frame unit 13 includes right-left guide frames 28, 29 that extend vertically, an upper frame 30 that extends horizontally between the guide frames 28, 29, and two lower frames 31, 32 that are slightly vertically-separated. The support frame unit 13 is mounted on the fixed frame unit 12 to be vertically movable along the guide rails 22, 23 of the right-left side frames 18, 19 of the fixed frame unit 12 with the right-left guide frames 28, 29 fitted into the corresponding guide rails 22, 23.

A plurality of rollers 33 that roll as being slide-contacted to inner faces of the guide rails 22, 23 are attached to the right-left guide frames 28, 29 to reduce or eliminate friction and another resistance that may occur against inner faces of the guide rails 22, 23 when the guide frames 28, 29 slide in the guide rails 22, 23. According to the above, the support frame unit 13 can move smoothly in the vertical direction without rattling and moving laterally against the fixed frame unit 12.

Owing to that the support frame unit 13 is arranged with the outer frame thereof directly supported by the outer frame of the fixed frame unit 12 as described above, structural strength of the support frame unit 13 itself and the entire apparatus is improved. Thus, it is possible to actualize the object support apparatus 10 having a high-load-resistant and high-strength structure capable of supporting heavy load of an object A.

A right-left pair of attaching stays 34 vertically extending just in front of the guide frames 28, 29 are attached to the support frame unit 13 for fixing the object A. Further, a brake device 35 is arranged at the support frame unit 13 at the center of the upper frame 30.

The first spring 14 includes tension coil springs 36, 37 arranged just at the inner side from the right-left guide frames 28, 29 of the support frame unit 13 in a bilaterally symmetric manner and in parallel in the right-left direction, each tension coil spring 36, 37 including two springs. Each of the tension coil springs 36, 37 is vertically hung with the upper end thereof fixed to the upper frame 16 of the fixed frame unit 12 and the lower end fixed to the upper-side lower frame 31 of the support frame unit 13.

Figure 5:
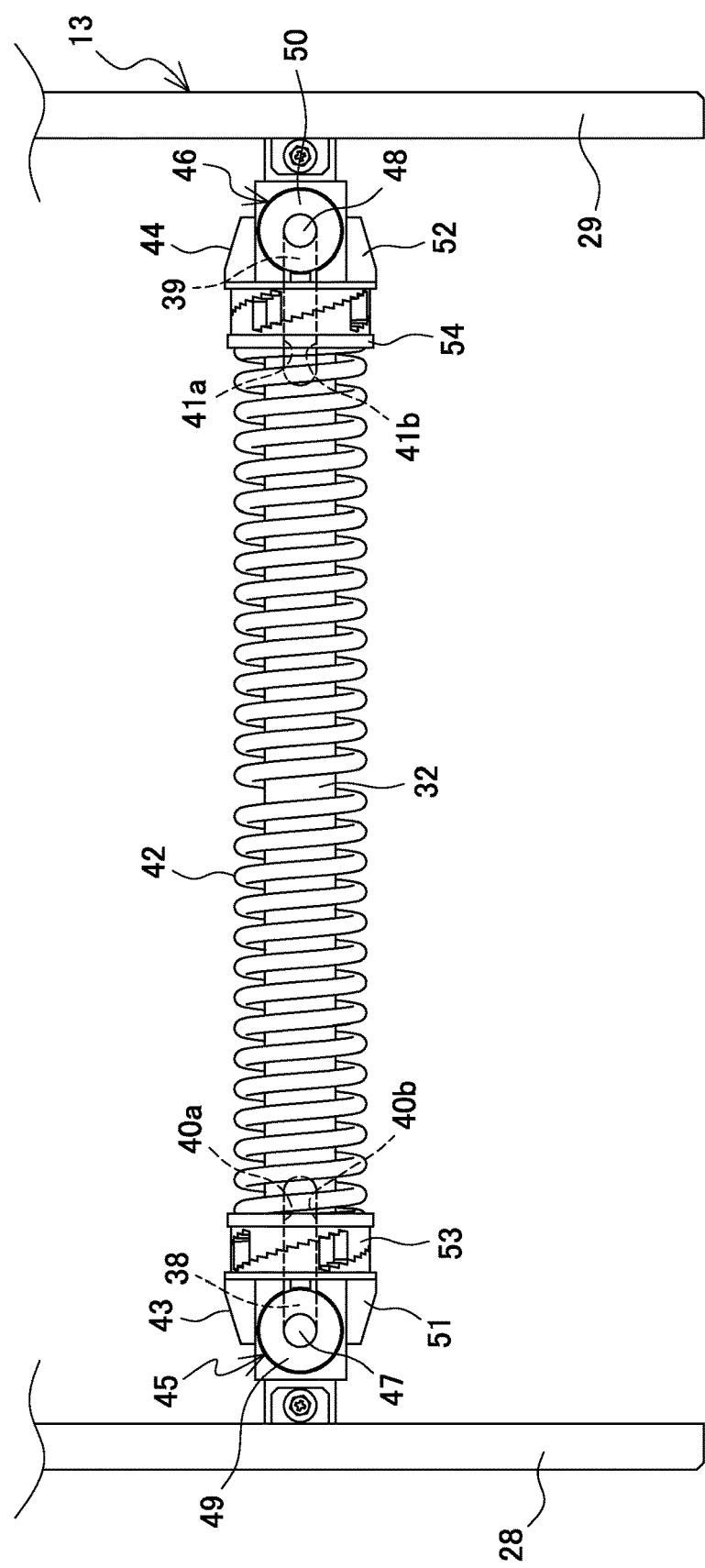
FIG. 5 is an enlarged view illustrating a lower frame at the lower side of the support frame unit and a second spring.

As illustrated in FIG. 5, two cam grooves 38, 39 are arranged at the lower-side lower frame 32 of the support frame unit 13 in a bilaterally symmetric manner as penetrating the lower frame 32 in the front-rear direction. As illustrated in FIGS. 4A and 4B for the cam groove 38 at the left side in FIG. 5, each of the cam grooves 38, 39 extends horizontally by a predetermined length approximately from a lateral end of the lower frame 32 toward the opposite side as having a first movable cam face 40a, 41a facing downward at the upper side and a second movable cam face 40b, 41b facing upward at the lower side that are faced to each other.

A second spring 42 being a compression coil spring is externally arranged at the lower frame 32. Owing to that the second spring 42 is externally arranged to the lower frame 32 that structures apart of the support frame unit 13 as described above, it is possible to stably prevent buckling from occurring due to compression. In another embodiment, it is also possible to arrange a second spring 42 at the inside of a cylinder-shaped lower frame 32.

Cam follower members 45, 46 are arranged at right-left ends of the second spring 42 respectively via cam follower holders 43, 44 that are externally fitted to the lower frame 32 in a slidable manner. As illustrated in FIG. 4A for the cam follower member 45 at the left side in FIG. 5, the cam follower member 45, 46 includes a first cam follower 47, 48 that is straight rod-shaped having a circular cross-section as penetrating through the cam groove 38, 39 in the front-rear direction. Further, the cam follower member 45, 46 includes a second cam follower 49, 50 that is roller-shaped as being arranged at both front-rear ends of the first cam follower 47, 48 protruding to front-rear sides from the cam groove 38, 39.

The first cam follower 47, 48 can move laterally along the cam groove 38, 39 within the cam groove 38, 39 with the outer circumferential face thereof contacted to the first movable cam face 40a, 41a and the second movable cam face 40b, 41b. The second cam follower 49, 50 may be rotatably arranged at both the ends of the first cam follower 47, 48, for example, via a rolling bearing.

The second cam follower 49, 50 is arranged as being contacted to the fixed cam face 26, 27 of the corresponding fixed cam member 24, 25. Here, the second cam follower 49, 50 is horizontally urged outward by the second spring 42 to be pressed to the fixed cam face 26, 27 of the corresponding fixed cam member 24, 25.

As illustrated in FIG. 4B for the cam follower holder 43 at the left side in FIG. 5, the cam follower holder 43, 44 includes a first holder member 51, 52 that is arranged at the outside of the second spring 42 and a second holder member 53, 54 that is arranged at the inside thereof along the axial direction of the second spring 42. The first holder member 51, 52 holds the first cam follower 47, 48 in a rotatable manner, for example, via a bearing. The second holder member 53, 54 is a spring receiver that receives an end of the second spring 42 with an end face thereof.

The first holder member 51, 52 and the second holder member 53, 54 include mating faces respectively each having a plurality of steps capable of being complementarily engaged with each other arranged stepwise in the circumferential direction so as to structure a claw joint with mutual engagement. Length in the axial direction of the cam follower holders 43, 44 can be varied by varying the mating position of the mating faces with relative circumferential rotation of the first holder member 51, 52 and the second holder member 53, 54.

As illustrated in FIG. 4A, the two cam plates of the fixed cam member 24 are arranged as being symmetric in the front-rear direction along the axial direction of the cam follower member 45. Accordingly, a pressing force of the respective cam plates to the cam follower member 45 is exerted symmetrically in the front-rear direction as being distributed along the axial direction thereof. Although it is not illustrated, the pressing force of the respective cam plates of the fixed cam member 25 to the cam follower member 46 at the other side is also exerted symmetrically in the front-rear direction similarly as being distributed along the axial direction.

According to the above, the cam follower members 45, 46 are horizontally held stably in the cam grooves 38, 39.

Further, since the respective cam plates of the fixed cam members 24, 25 have less burden owing to the above-described force distribution, thinning thereof can be achieved. Accordingly, thinning and lightening of the entire apparatus can be achieved.

Further, separate structural element does not exist between the respective cam plates of the fixed cam member 24, 25 and the lower frame 32 of the support frame unit 13 at which the cam groove 38, 39 is arranged. Accordingly, the respective cam plates of the fixed cam members 24, 25 can be arranged as being mutually distanced small in the front-rear direction. As a result, the first cam followers 47, 48 of the cam follower members 45, 46 can be shortened in the axial direction. Accordingly, it is possible to previously eliminate a fear of excessive deflection and deformation or breakage that may occur when the first cam followers 47, 48 are excessively long.

Figure 6:
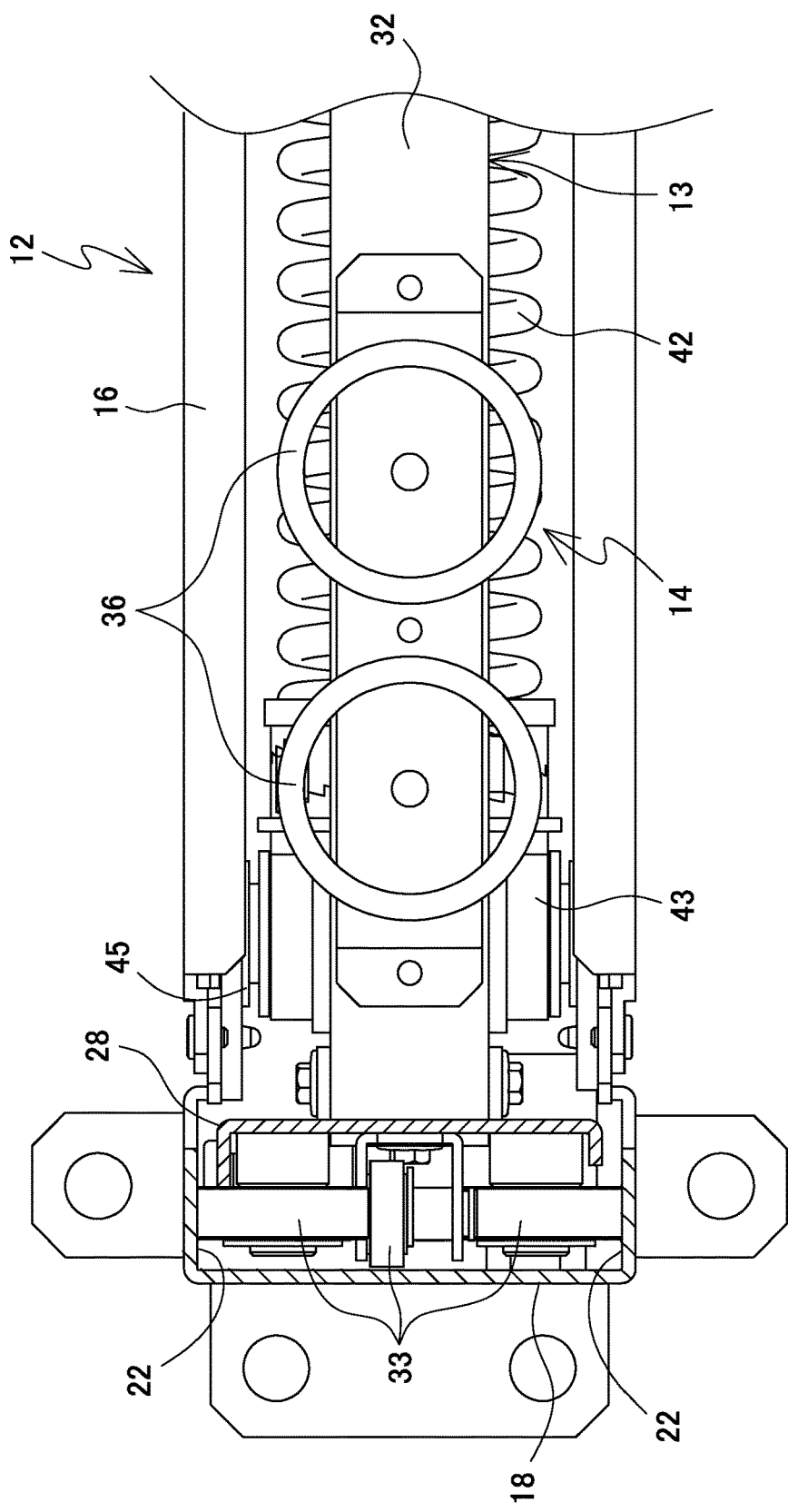
FIG. 6 is a partially-enlarged planar view viewing the support frame unit from the above.

FIG. 6 is a plane view viewing from the above as partially enlarging a left part of the support frame unit 13 in the drawing. As illustrated in FIG. 6, in the object support apparatus 10 of the present embodiment, the entire tension coil springs 36 of the first spring 14 are planarly arranged as being approximately overlapped vertically with the second spring 42. Although it is not illustrated, the entire tension coil springs 37 at the other side are also planarly arranged as being approximately overlapped vertically with the second spring 42 as well. According to such arrangement, even when the outer diameter of the first spring 14 and/or the second spring 42 is large, the object support apparatus 10 can be designed thin while suppressing the depth dimension thereof to the extent possible.

Here, as illustrated in FIG. 3, the fixed cam faces 26, 27 are divided into three regions as follows depending of contact positions with the second cam followers 49, 50. A first region S1 denotes a region where the normal direction at a contact point with the second cam follower 49, 50 is oriented upward with respect to the horizontal direction. A second region S2 denotes a region where the normal direction at a contact point with the second cam follower 49, 50 is substantially oriented in the horizontal direction, that is, where the tangential direction thereof is substantially oriented in the vertical direction. Here, "substantially horizontal orientation" denotes orientation including a case capable of being deemed to be horizontal as being slightly upward or downward with respect to the perfect horizontal direction to the degree ignorable from viewpoints of operational effects, performance, or functions of the object support apparatus 10. A third region S3 denotes a region where the normal direction at a contact point with the second cam follower 49, 50 is oriented downward with respect to the horizontal direction.

The operational handle portion 15 includes right-left vertical transmission rods 55 that are attached to the front of the right-left guide frames 28, 29 of the support frame unit 13 as being relatively slide-movable vertically within a previously-defined slight range. An approximately-L-shaped connection stay 56 is connected to a lower part of each transmission rod 55. A long handle bar 57 extending in the right-left direction is held by both the connection stays 56 at the leading ends thereof that protrude frontward. Owing to operation of the operational handle portion 15 while grasping the handle bar 57 with a hand, the support frame unit 13 and the object A can be lifted and lowered.

Figure 7:
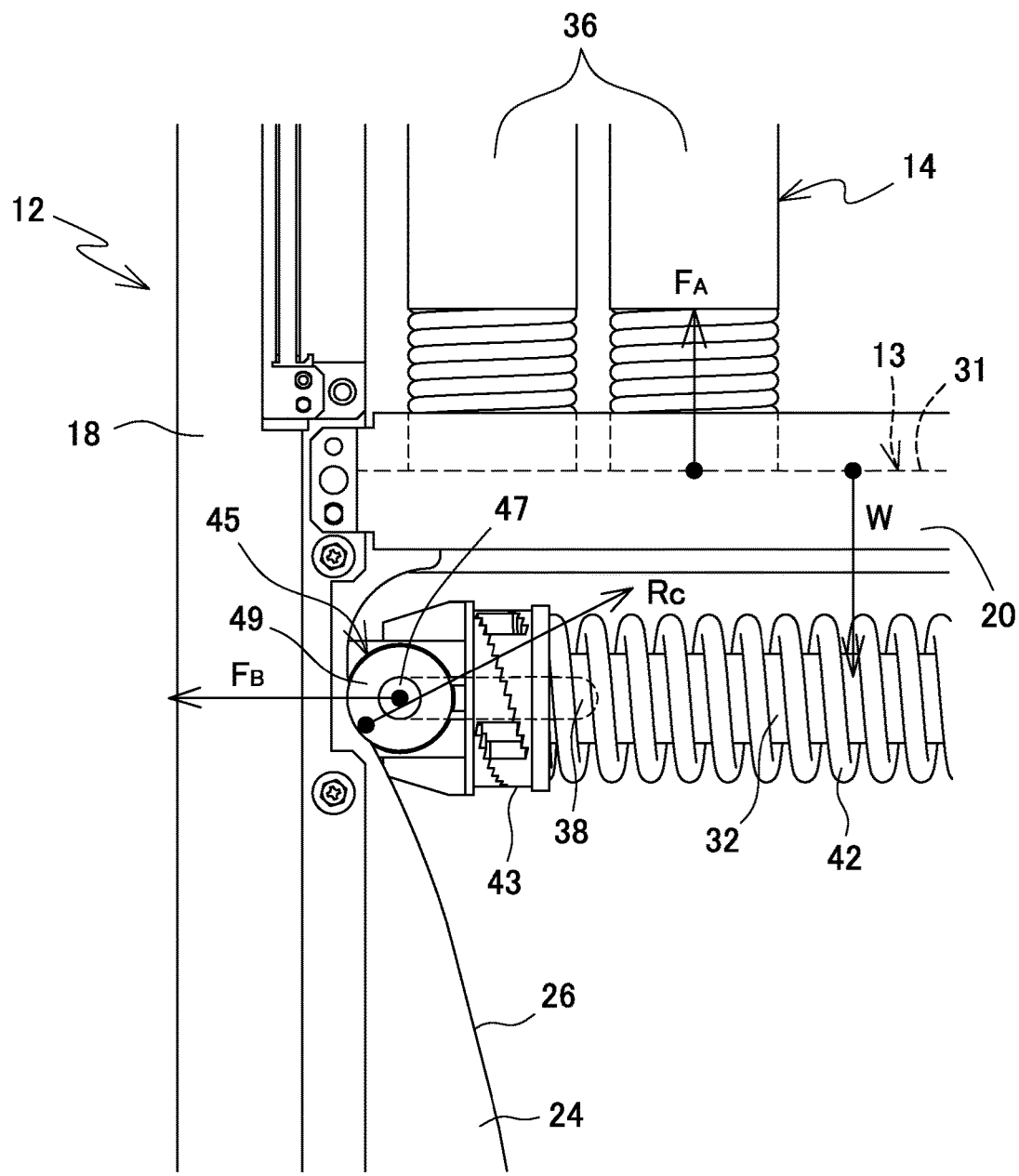
FIG. 7 is a partially-enlarged view illustrating a fixed cam face and the cam follower member in FIG. 3.

FIGS. 3 and 7 illustrate a case that the support frame unit 13 to which the object A is attached is at an uppermost position in a movement range thereof. The second cam follower 49, 50 stays at the upper end of the first region S1 of the fixed cam face 26, 27. At this position, balance is kept around the cam follower member 45, 46 among a load W of the object A exerted on a system structured with the cam follower member 45, 46, the fixed frame unit 12, and the support frame unit 13, a spring force FA of the first spring 14, a spring force FB of the second spring 42, and a reaction force from the fixed cam face 26, 27.

In the first region S1, displacement of the respective tension coil springs 36, 37 of the first spring 14 is small, so that the spring force FA thereof is smaller than the load W of the object A. The reaction force Rc exerted from the fixed cam face 26, 27 to the second cam follower 49, 50 includes an upward component in the vertical direction. Accordingly, owing to that the component is added to the spring force FA of the first spring 14 as an assist force, balance is kept with the load W in the vertical direction.

Figure 8:
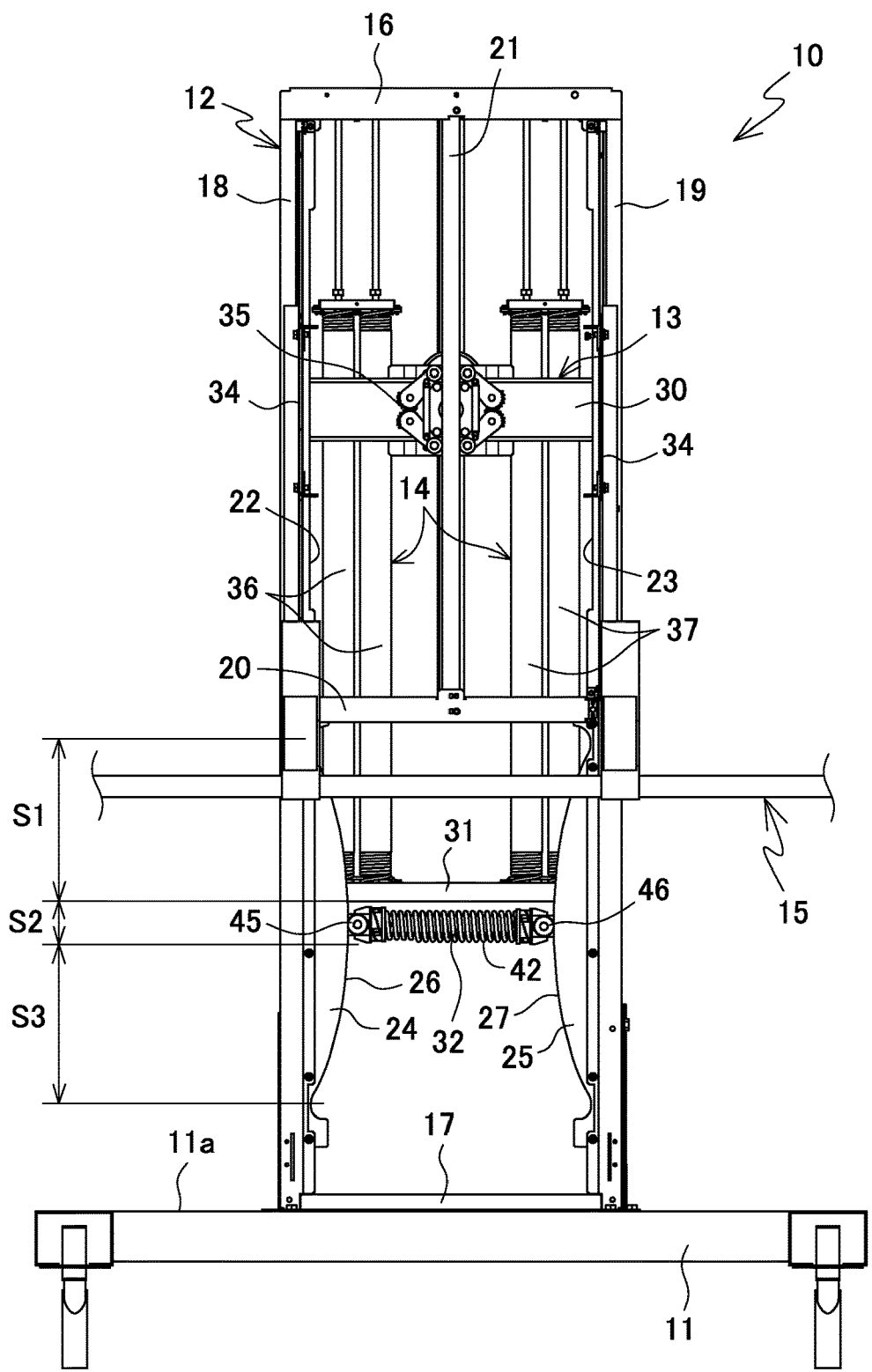
FIG. 8 is a front view similar to FIG. 3 with the support frame unit located at an intermediate position.
Figure 9:
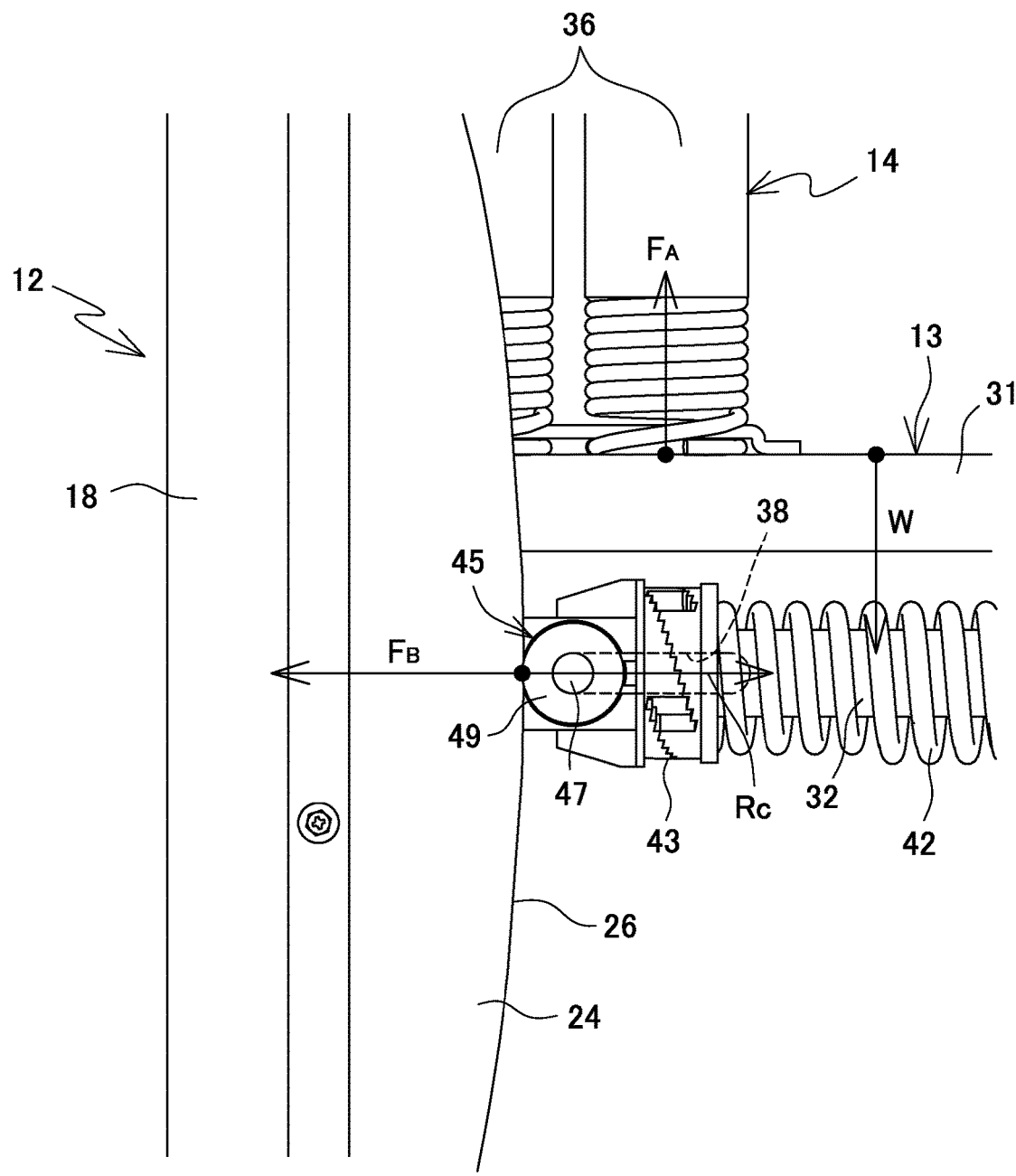
FIG. 9 is a partially-enlarged view illustrating a fixed cam face and the cam follower member in FIG. 8.

FIGS. 8 and 9 illustrate a case that the support frame unit 13 to which the object A is attached is at an intermediate position in the movement range thereof. The second cam follower 49, 50 stays at a position in the second region S2 of the fixed cam face 26, 27. At this intermediate position as well, balance is kept around the cam follower member 45, 46 among the load W of the object A exerted on the system structured with the cam follower member 45, 46, the fixed frame unit 12, and the support frame unit 13, the spring force FA of the first spring 14, the spring force FB of the second spring 42, and the reaction force from the fixed cam face 26, 27.

In the second region S2, the spring force FA of the first spring 14 and the load W are substantially balanced. Here, the reaction force Rc from the fixed cam face 26, 27 is balanced with the spring force FB of the second spring 42 as substantially having only a horizontal component without having a vertical component.

Figure 10:
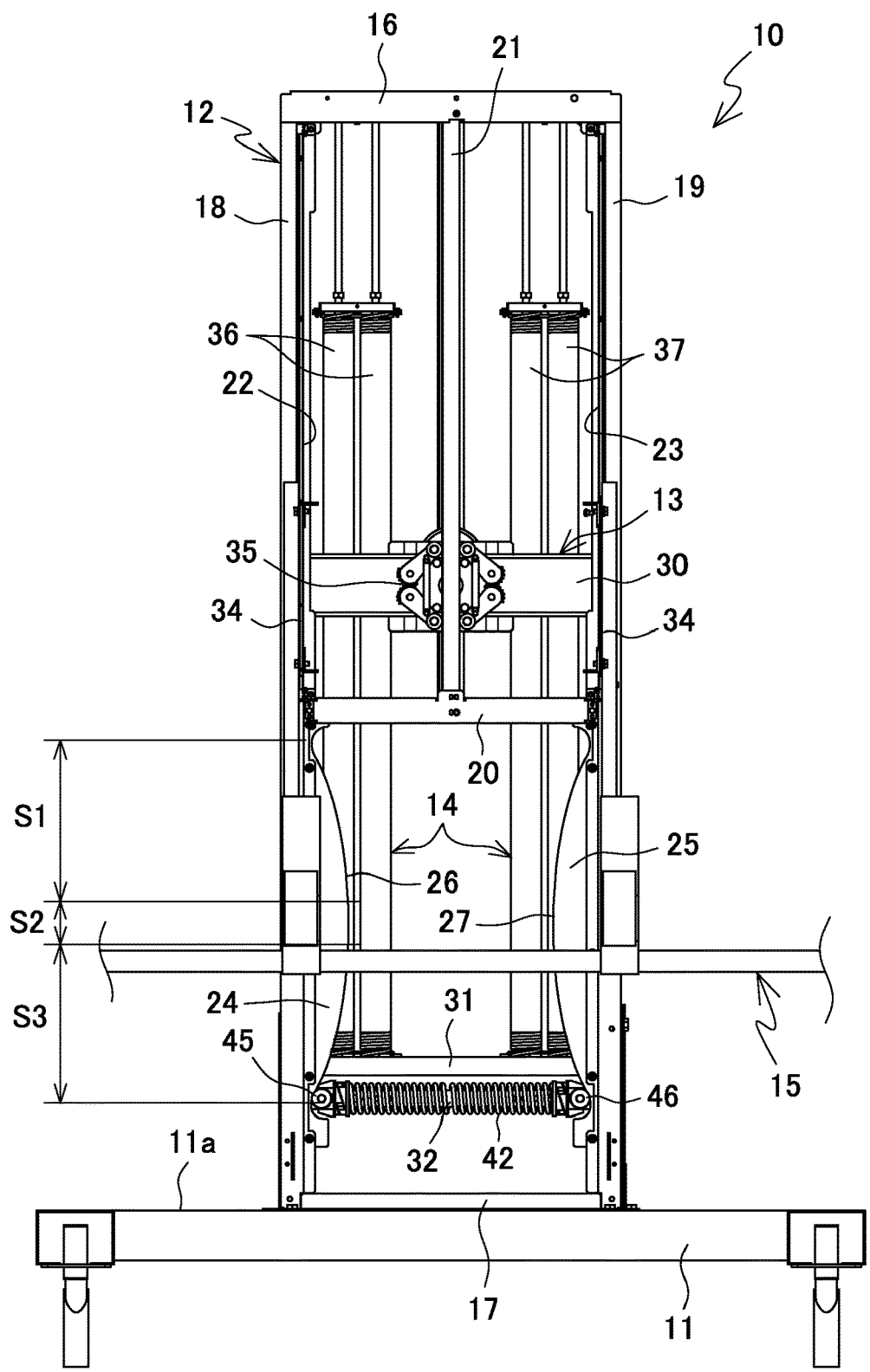
FIG. 10 is a front view similar to FIG. 3 with the support frame unit located at the lowermost position.
Figure 11:
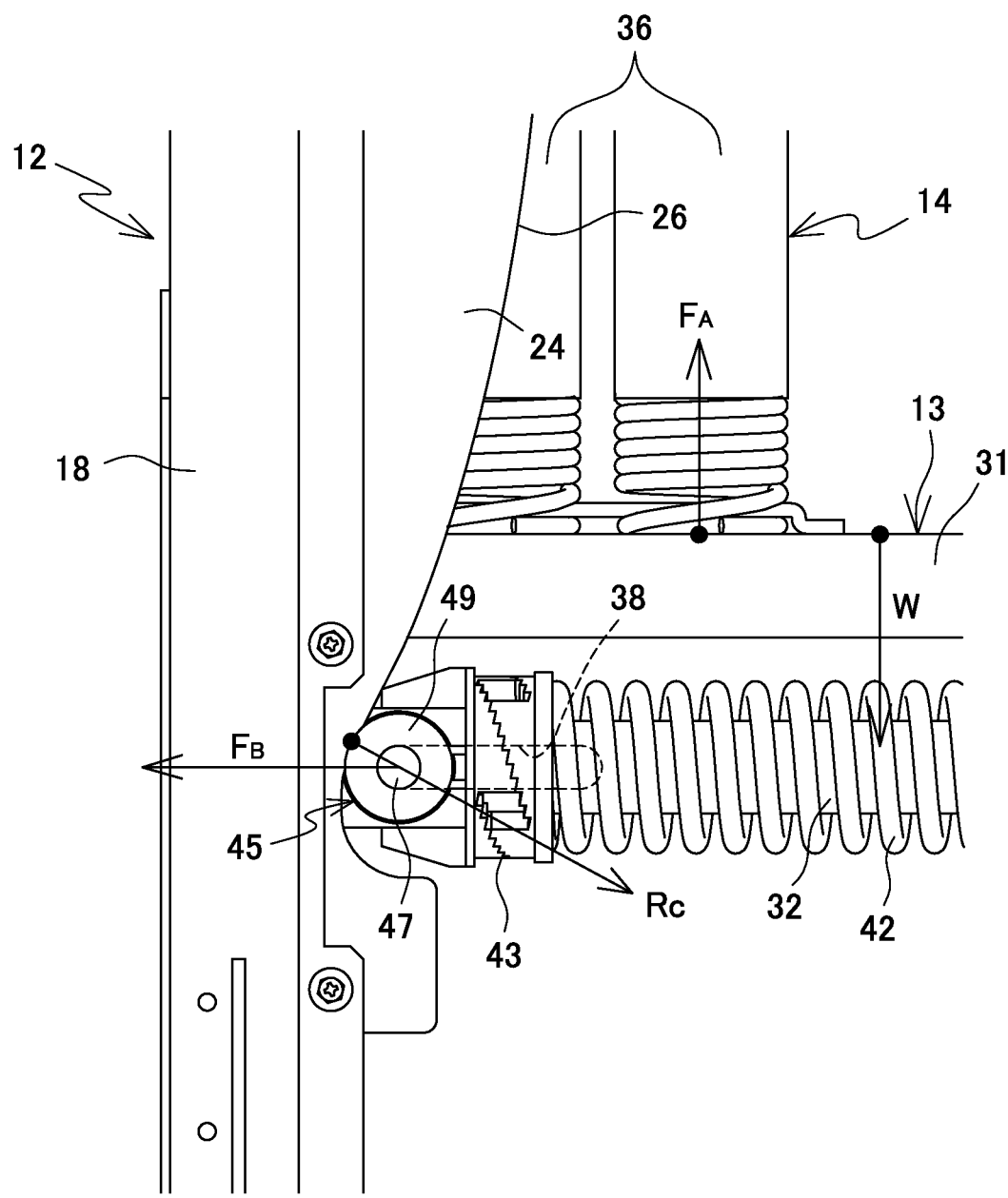
FIG. 11 is a partially-enlarged view illustrating a fixed cam face and the cam follower member in FIG. 10.

FIGS. 10 and 11 illustrate a case that the support frame unit 13 to which the object A is attached is at a lowermost position in the movement range thereof. The second cam follower 49, 50 stays at the lower end of the third region S3 of the fixed cam face 26, 27. At the lower end position as well, balance is kept around the cam follower member 45, 46 among the load W of the object A exerted on the system structured with the cam follower member 45, 46, the fixed frame unit 12, and the support frame unit 13, the spring force FA of the first spring 14, the spring force FB of the second spring 42, and the reaction force Rc from the fixed cam face 26, 27.

In the third region S3, displacement of the respective tension coil springs 36, 37 of the first spring 14 is large, so that the spring force FA thereof is larger than the load W of the object A. The reaction force Rc exerted from the fixed cam face 26, 27 to the second cam follower 49, 50 includes a downward component in the vertical direction. Accordingly, owing to that the component is exerted in a direction to reduce push-up force caused by the spring force FA of the first spring 14, balance is kept with the load W in the vertical direction.

Since there is no change for the first spring 14, the spring force FA thereof becomes relatively large when the load W of the object A becomes small. Accordingly, it is required to lessen the assist force due to the fixed cam face 26, 27 to the spring force FA in the first region S1 and to enlarge the downward force that reduces the push-up force due to the spring force FA in the third region S3.

In contrast, when the load W of the object A becomes large, the spring force FA of the first spring 14 becomes relatively small. Accordingly, it is required to enlarge the assist force due to the fixed cam face 26, 27 to the spring force FA in the first region S1 and to lessen the downward force that reduces the push-up force due to the spring force FA in the third region S3.

In the object support apparatus 10, adjustment is performed to increase and decrease the urging force FB of the second spring 42 at the same height position at the support frame unit 13, resulting in increasing and decreasing of the reaction force Rc from the fixed cam face 26, 27 by adjusting compression displacement of the second spring 42 as varying the axial length of the cam follower holder 43, 44. In the case that the load W is small, the reaction force Rc from the fixed cam face 26, 27 and the vertical component thereof are lessened by decreasing the urging force FB of the second spring 42 as shortening the axial length of the cam follower holder 43, 44. In contrast, in the case that the load W is large, the reaction force Rc from the fixed cam face 26, 27 and the vertical component thereof are enlarged by increasing the urging force FB of the second spring 42 as elongating the axial length of the cam follower holder 43, 44. Thus, the support force of the object support apparatus 10 can be balanced on a consistent basis with a different load.

Figure 12:
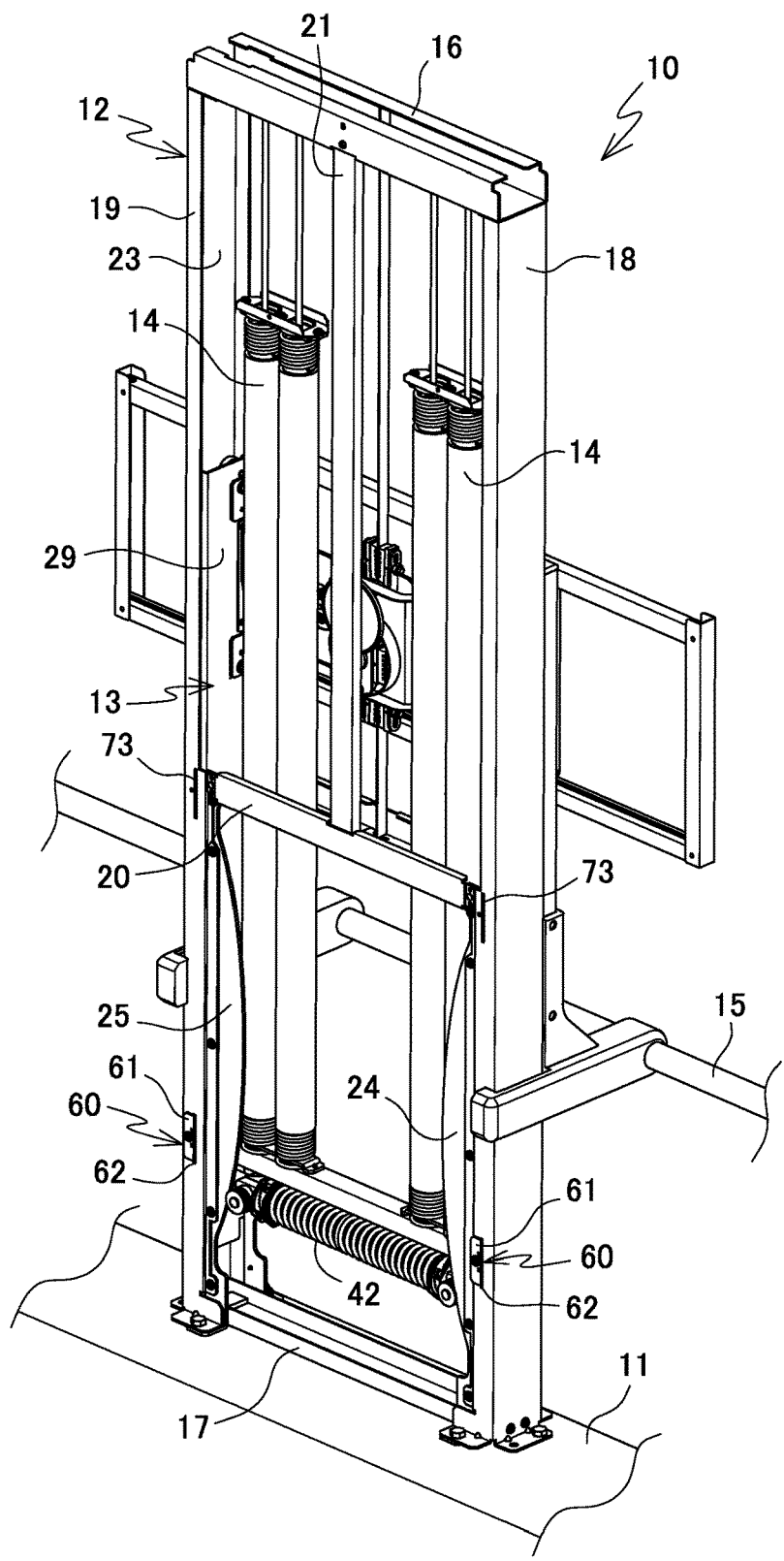
FIG. 12 is a perspective view of an object support apparatus of the present embodiment viewing from a rear face side.

The object support apparatus 10 of the present embodiment includes a regulating device to lock the support frame unit 13 so as to stay at a predetermined position with respect to the fixed frame unit 12. As illustrated in FIG. 12, a regulating device 60 is arranged so that the support frame unit 13 is anchored to the fixed frame unit 12 at a position where the support frame unit 13 is lowered to the lower most position to facilitate attaching of a heavy object A such as a large-screen monitor.

Figure 13:
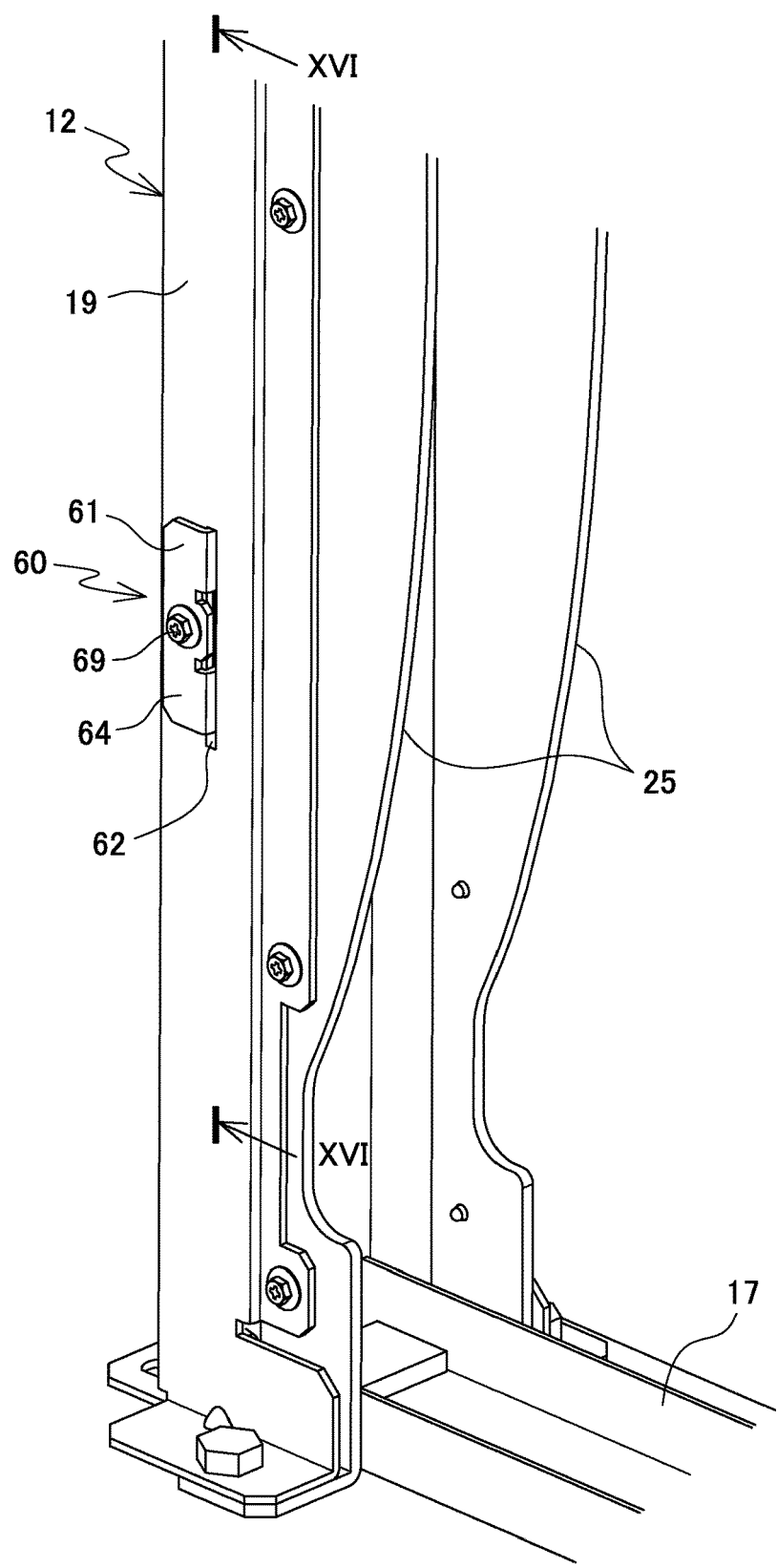
FIG. 13 is a partially-enlarged perspective view illustrating a regulating device.

As illustrated in FIGS. 12, 13, the regulating device 60 includes regulating members 61 that are attached in a detachably attachable manner to rear faces of the right-left side frames 18, 19 of the fixed frame unit 12. Further, as illustrated in FIGS. 13, 14, the regulating device 60 includes fixed-side slits 62 formed at respective lower parts of the rear faces of the right-left side frames 18, 19 each having a U-shaped cross-section and movable-side slits 63 formed at respective lower parts of the rear faces of the right-left guide frames 28, 29 each similarly having a U-shaped cross-section of the support frame unit 13.

Figure 14:
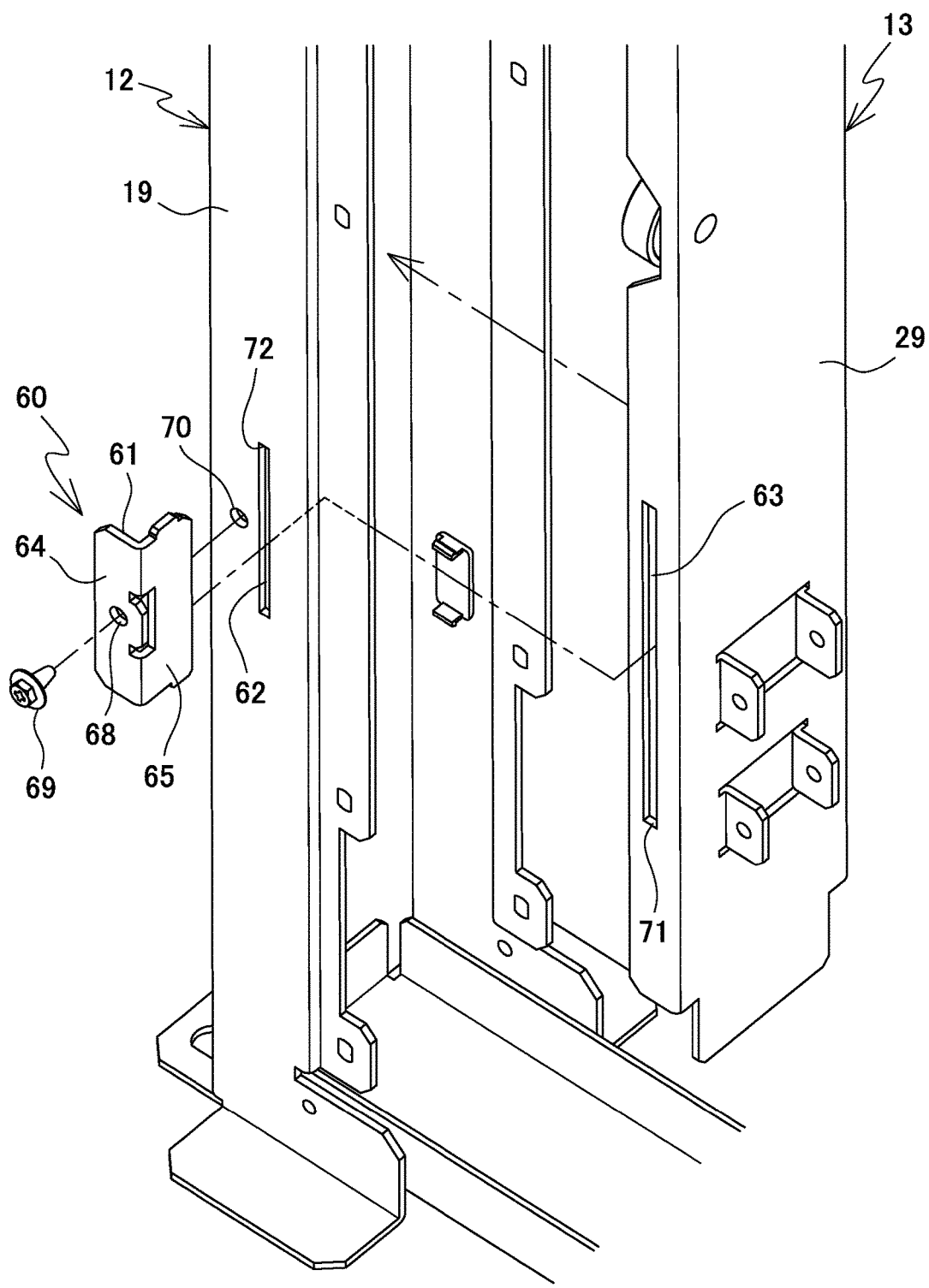
FIG. 14 is an exploded perspective view of the regulating device in FIG. 13.

As illustrated in FIG. 14, the regulating member 61 is formed into an L-shape structured with a base plate portion 64 that is contacted to an outer face of the rear face of the side frame 18, 19 and an engaging plate portion 65 that is to be inserted through the fixed-side slit 62 of the fixed frame unit 12, for example, by bending a metal-made small flat plate that is approximately rectangular. An upper engaging projection 66 that is oriented upward is arranged at an upper end of the engaging plate portion 65 at a position close to the base plate portion 64. A lower engaging projection 67 that is oriented downward is arranged at a lower end of the engaging plate portion 65 at a position apart from the base plate portion 64. A circular hole 68 is formed as piercing the base plate portion 64 approximately at the center thereof. A leading end of a fastener 69 is inserted through the circular hole 68 from the outer side and is snap-fastened to a through-hole 70 that is formed at the rear face of the side frame 18, 19, so that the regulating member 61 is fixed to the side frame 18, 19.

The fixed-side slit 62 straightly extends in the vertical direction as having a predetermined narrow width through which the engaging plate portion 65 of the regulating member 61 can pass in a slightly loose manner and a predetermined vertical length. The movable-side slit 63 also straightly extends in the vertical direction as having a predetermined narrow width through which the engaging plate portion 65 of the regulating member 61 can pass in a slightly loose manner and a predetermined vertical length that is sufficiently longer than the fixed-side slit 62. The fixed-side slit 62 and the movable-side slit 63 are arranged, when the height positions thereof are matched, at positions to be aligned in the horizontal direction as viewing from the rear face of the object support apparatus 10 so that the engaging plate portion 65 of the regulating member 61 can pass therethrough at once.

Figure 15:
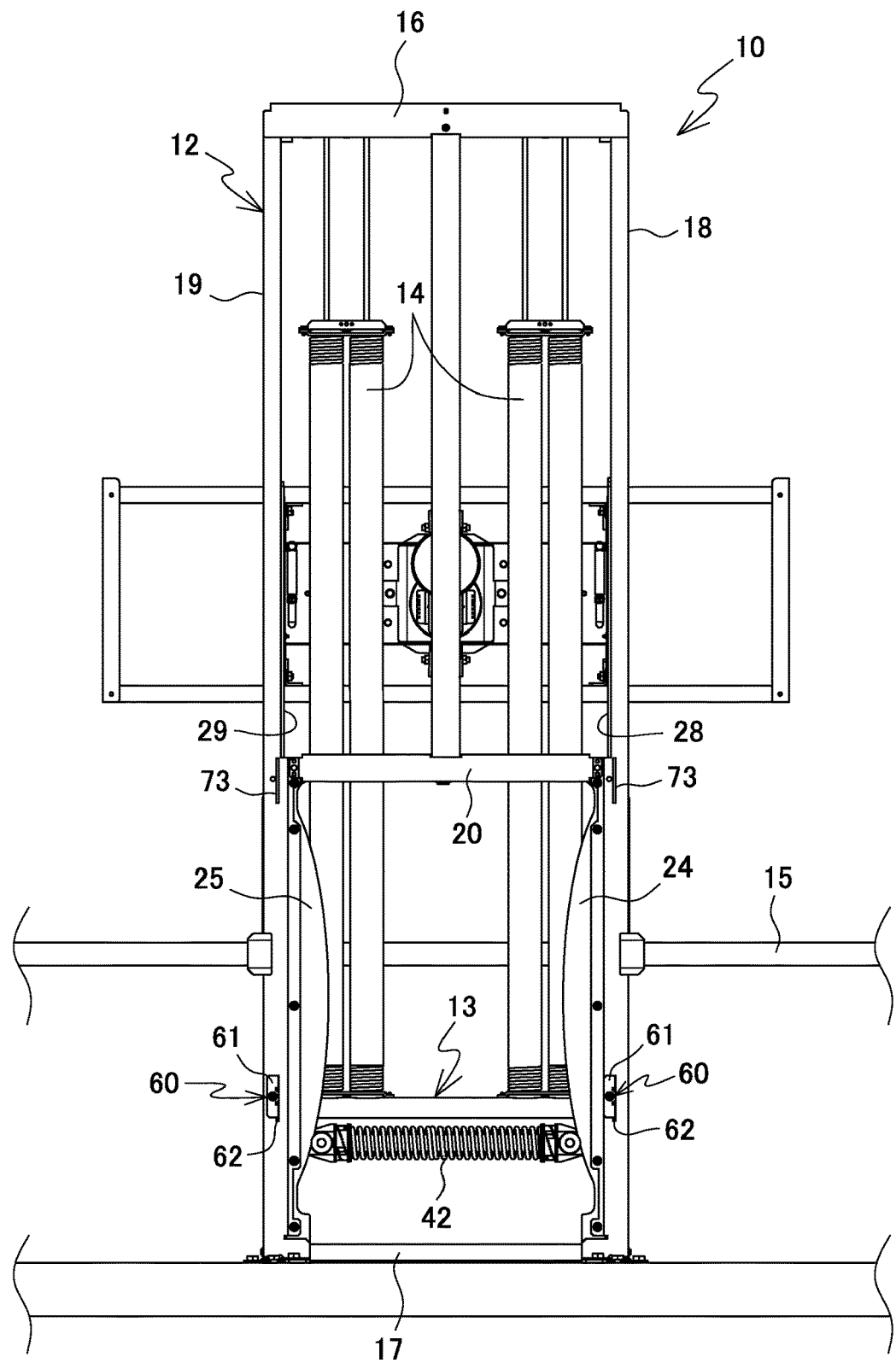
FIG. 15 is a rear view of the object support apparatus in which the support frame unit is locked at a lower position.

When an object is to be attached to the object support apparatus 10 or when the object support apparatus 10 having no load without an object attached is to be carried, the support frame unit 13 is locked using the regulating device 60 in a state of being depressed to the vicinity of the lowermost position as illustrated in FIG. 15. As illustrated in the drawings, attaching of the regulating member 61 is performed by inserting the engaging plate portion 65 at once to the fixed-side slit 62 and the movable-side slit 63 that are aligned in height while plate faces of the base plate portion 64 and the engaging plate portion 65 are oriented in the vertical direction.

Owing to that the fastener 69 is snap-fastened to the through-hole 70 of the side frame 18, 19 through the circular hole 68 of the base plate portion 64, the regulating member 61 is fixed not to be easily detached as long as not to be purposely removed. Here, the regulating member 61 can move vertically and/or horizontally slightly within a range of the fixed-side slit 62.

Figure 16:
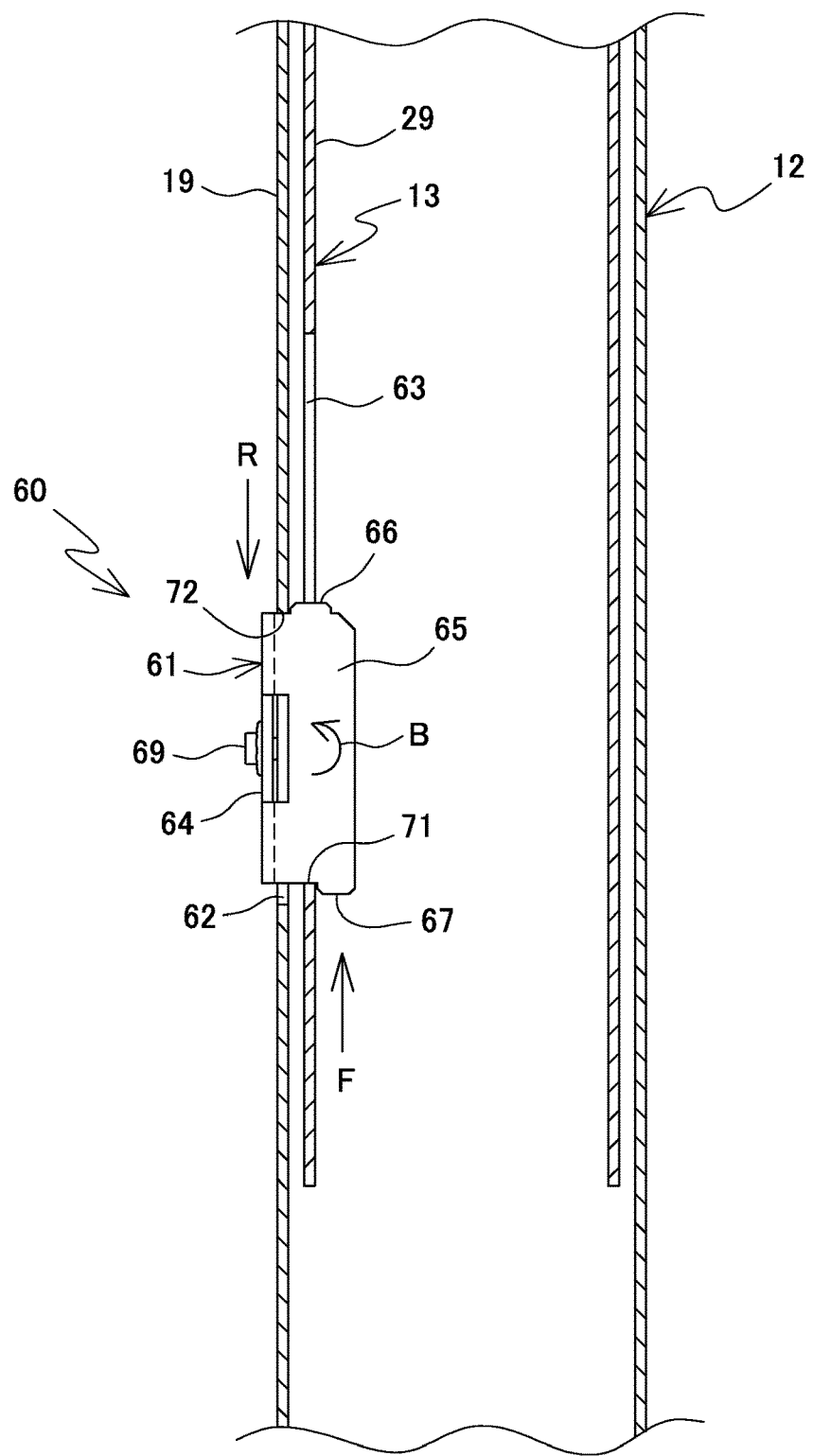
FIG. 16 is a partial cross-sectional view illustrating the regulating device along line XVI-XVI in FIG. 13.

FIG. 16 illustrates the regulating member 61, the fixed-side slit 62, and the movable-side slit 63 in the locked state. Since the guide frame 29 of the support frame unit 13 is continuously urged upward by the first spring 14, a movable-side engaging portion 71 at the lower end of the movable-side slit 63 pushes the regulating member 61 upward as being contacted to the lower end of the engaging plate portion 65. According to the above, the regulating member 61 is locked while the upper end of the engaging plate portion 65 is pressed to a fixed-side engaging portion 72 at the upper end of the fixed-side slit 62.

As a result, the support frame unit 13 is locked so as not to be further moved upward with respect to the fixed frame unit 12. In particular, in a no-load state that an object is not attached to the object support apparatus 10, the urging force of the first spring 14 is exerted directly to the support frame unit 13 without being diminished. Accordingly, the locked state of FIG. 16 can be maintained.

The heavier the object A to be attached to the object support apparatus 10 is, the larger the urging force of the first spring 14 exerted to the regulating member 61 from the support frame unit 13 side is set. In such a case, in a no-load state without an object attached, a large compression load is exerted in the vertical direction to the regulating member 61 that receives the urging force between the fixed-side engaging portion 72 and the movable-side engaging portion 71.

In the present invention, the regulating member 61 is designed to have an appropriate length in the vertical direction with the plate thickness kept relatively thin as being vertically oriented so that the plate face thereof is matched to the direction of the compression load. Accordingly, the maximum withstand load thereof can be set sufficiently large so as to be capable of receiving a large urging force of the first spring 14 without causing deformation at the regulating member 61. As a result, it is not required for the fixed-side slit 62 and the movable-side slit 63 to be enlarged in width regardless of the magnitude of the urging force of the first spring 14.

Conventionally, there has been a nested extendable post in which fixing thereof in height is performed, for example, horizontally inserting a bar-shaped rod member or the like. In such a case, it is required for the rod member to have a larger diameter to increase the maximum withstand load in accordance with the magnitude of the load to be attached to the post. Accordingly, a through-hole sized as being matched with the diameter of the rod member is formed at the post.

Such a large through-hole at the post causes a fear of plugging with a foreign matter and an accident such as injury of an operator with a finger entering therein after the rod member is removed. Further, in a case that such a rod member is used in the object support apparatus 10 of the present invention, dimensions of the side frames and the guide frames maybe required to be changed in design with respect to the size of the through-hole and decrease in strength caused thereby and cost increase of manufacturing and weight increase of the apparatus may be caused. According to the present invention, such problems are effectively solved by arranging the plate-shaped regulating member 61 with the plate face oriented vertically.

Regarding the regulating member 61, as illustrated in FIG. 16, the upper engaging projection 66 at the upper end of the engaging plate portion 65 is located just inside the upper end of the fixed-side slit 62 to be engaged therewith. Further, the lower engaging projection 67 at the lower end of the engaging plate portion 65 is located just inside the lower end of the movable-side slit 63 to be engaged therewith. Thus, in the locked state, it is designed that, even when the fastener 69 is removed, the regulating member 61 is not pulled out from the fixed-side slit 62 and the movable-side slit 63 owing to the upper engaging projection 66 and the lower engaging projection 67.

Further, in the regulating member 61, the urging force F of the first spring 14 to be exerted vertically upward from the movable-side engaging portion 71 and the reaction force R to be exerted vertically downward from the fixed-side engaging portion 72 are oriented opposite in parallel to each other as being slightly deviated laterally. Accordingly, moment is generated to rotate the engaging plate portion 65 in the counterclockwise direction as illustrated by arrow B in FIG. 16. When the engaging plate portion 65 is rotated in the direction of arrow B, the support frame unit 13 may not be fixed in a locked state as being unstable with rattling against the fixed frame unit 12. In addition, it is considerable that the regulating member 61 comes out in the worst case. Regarding the regulating member 61 of the present embodiment, the base plate portion 64 is contacted to the outer face of the rear face of the side frame 19 in addition to engagement between the upper engaging projection 66 and the upper end of the fixed-side slit 62. Accordingly, rotation of the engaging plate portion 65 in the direction of arrow B can be effectively prevented.

Further, in the regulating member 61, as described above, the fixed-side slit 62 and the movable-side slit 63 are formed narrow to the extent that the engaging plate portion 65 can loosely pass therethrough. When the engaging plate portion 65 is inserted through the fixed-side slit 62, the base plate portion 64 is contacted to the outer face of the rear face of the side frame 19. Therefore, the regulating member 61 is prevented from sticking with excessive penetration and dropping from the other side. Accordingly, the locked state can be maintained safely and stably.

As described above, the movable-side slit 63 is formed sufficiently longer than the fixed-side slit 62 in the vertical direction. Accordingly, as illustrated in FIG. 17, the guide frame 29 of the support frame unit 13 can be moved downward from the lock position in FIG. 16 within a vertical range of the length of the movable-side slit 63 even without removing the regulating member 61.

In particular, when an object is attached to the support frame unit 13 or a downward external force is applied, the urging force of the first spring 14 is diminished and the guide frame 29 is easily moved downward. In this case as well, the movement range of the guide frame 29 is regulated within the vertical range of the length of the movable-side slit 63. Accordingly, it is possible to safely perform an operation to adjust and confirm a balanced state between the load of the object A and the support force of the object support apparatus 10 when attaching the object A. Here, since the regulating member 61 is fixed to the guide frame 29 with the fastener 69 as illustrated in the drawings, the regulating member 61 is prevented from coming out carelessly from the fixed-side slit 62 and the movable-side slit 63. Accordingly, safety of the abovementioned operation can be ensured.

Figure 17:
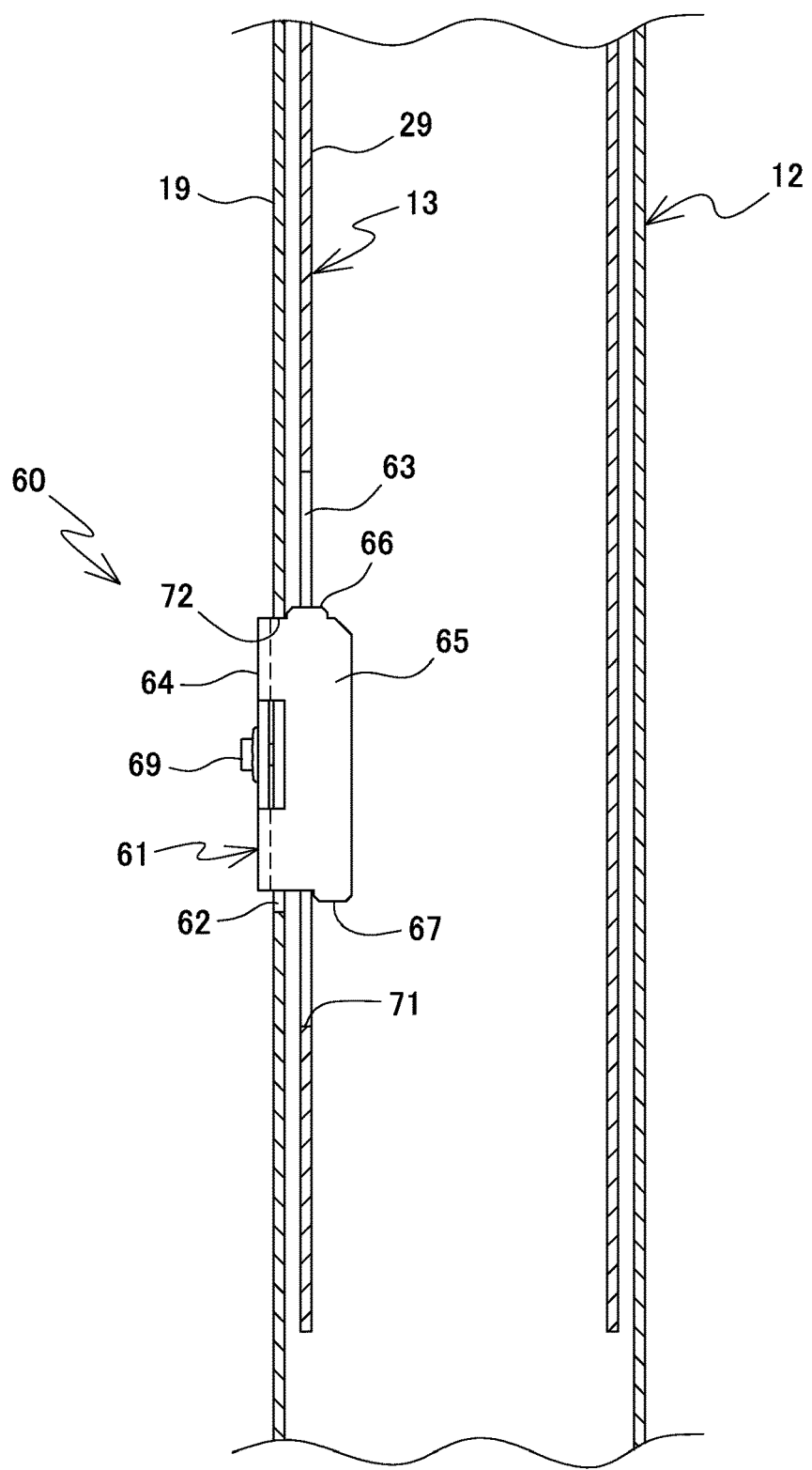
FIG. 17 is a partial cross-sectional view of the regulating device illustrating a state that locking can be released.

Further, in the state of FIG. 17, engagement between the lower engaging projection 67 and the lower end of the movable-side slit 63 is released. Accordingly, owing to that, after the fastener 69 is removed, the engaging plate portion 65 is moved downward within the range of the fixed-side slit 62 to release engagement between the upper engaging projection 66 and the upper end of the fixed-side slit 62, the regulating member 61 can be removed while the engaging plate 65 is pulled out from both the slits 63, 62. Thus, the locked state of the support frame unit 13 with respect to the fixed frame unit 12 is released.

As another example, it is also possible that the regulating member 61 is attached to the rear face of the side frame 19 with a screw. In this case, it is preferable that the regulating member 61 is arranged so that the upper end of the engaging plate portion 65 is contacted to the fixed-side engaging portion 72 of the fixed-side slit 62. This is easily actualized owing to, for example, that the circular hole 68 at the base plate portion 64 through which the screw penetrates is formed as a hole elongated in the vertical direction so that the position of the regulating member 61 is adjustable in the vertical direction.

Figure 18:
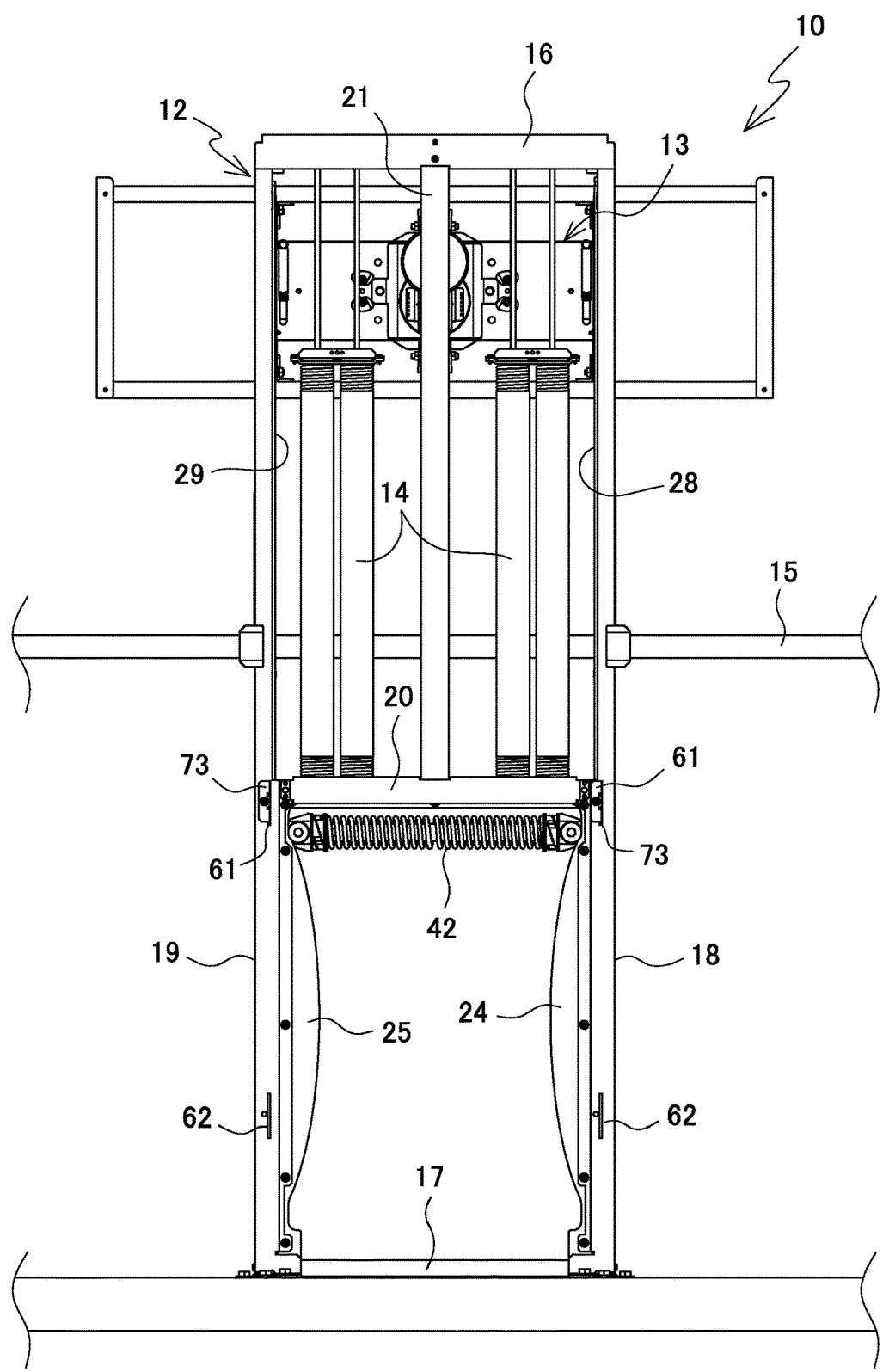
FIG. 18 is a rear view of the object support apparatus in which the support frame unit is locked at the uppermost position.

As illustrated in FIGS. 12 and 15, the regulating device 60 of the present embodiment includes additional fixed-side slits 73 at the right-left side frames 18, 19 in the vicinity of the intermediate frame 20. Owing to that the regulating member 61 is similarly attached to the fixed-side slit 73, the support frame unit 13 can be locked so as not to be moved with respect to the fixed frame unit 12 in the vicinity of the uppermost position thereof, as illustrated in FIG. 18.

According to the present invention, the regulating device 60 can be arranged so that the support frame unit 13 can be locked to the fixed frame unit 12 at a variety of positions between the uppermost position and the lowermost position. Here, not limited to one or two positions, the lock positions can be set at a number of positions as required.

Figure 19A:
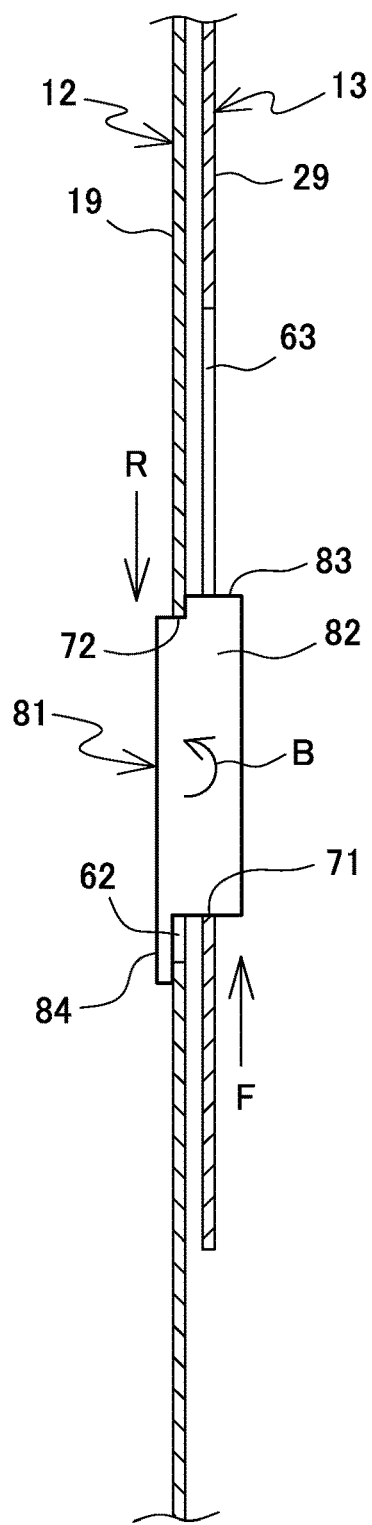
FIGS. 19A and 19B are cross-sectional views, being similar to FIGS. 16 and 17, illustrating a first modified example of the regulating member.
Figure 19B:
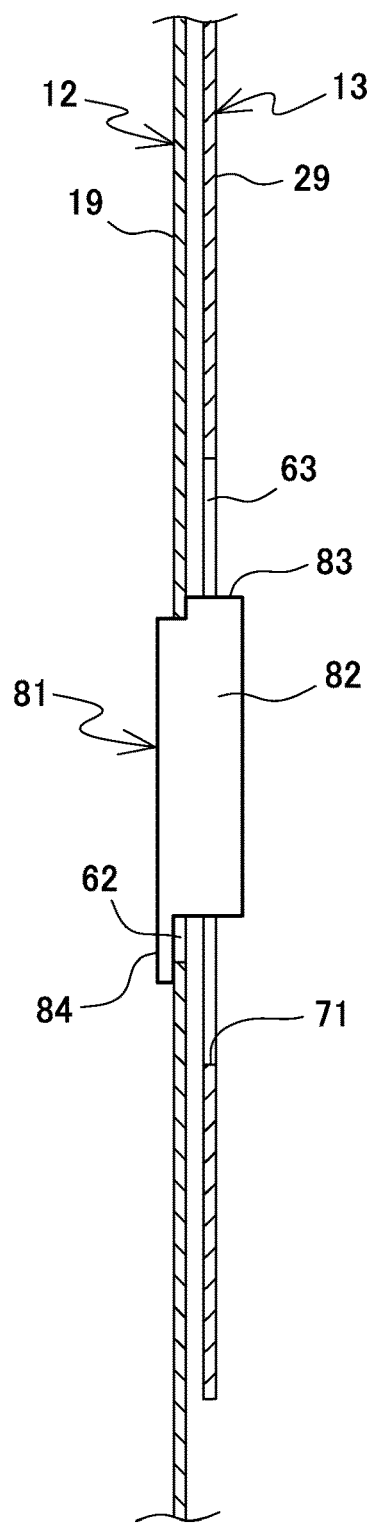

The regulating member 61 can be shaped variously. FIGS. 19A and 19B illustrate a regulating member 81 as a first modified example. The regulating member 81 includes an engaging plate portion 82 that is formed of an approximately rectangular flat plate elongated in the vertical direction. An upper engaging projection 83 and a lower engaging projection 84 are formed at the upper end and the lower end of the engaging plate portion 82, respectively.

In the locked state of FIG. 19A, the regulating member 81 is pushed upward while the movable-side engaging portion 71 at the lower end of the movable-side slit 63 is engaged with the lower end of the engaging plate portion 82 by the urging force of the first spring 14, and thereby, the upper end of the engaging plate portion 82 is pushed and locked to the fixed-side engaging portion 71 at the upper end of the fixed-side slit 62. According to the above, upward movement of the support frame unit 13 is restricted with respect to the fixed frame unit 12.

Here, the upper engaging projection 83 of the engaging plate portion 82 is located just inside the upper end of the fixed-side slit 62 to be engaged therewith. Accordingly, the regulating member 81 is not pulled out from the fixed-side slit 62 and the movable-side slit 63.

The lower engaging projection 84 of the engaging plate portion 82 is arranged just outside the lower end of the fixed-side slit 62 to be engaged therewith. As described above, the urging force F of the first spring 14 to be exerted vertically upward from the movable-side engaging portion 71 and the reaction force R to be exerted vertically downward from the fixed-side engaging portion 72 serve to rotate the regulating member 81 in the counterclockwise direction as indicated by arrow B in FIG. 19B. In the present modified example, owing to that the upper engaging projection 83 and the lower engaging projection 84 are engaged in the rotational direction with the upper and lower ends of the fixed-side slit 62 respectively, rotation of the engaging member 81 in the direction of arrow B can be effectively prevented.

As illustrated in FIG. 19B, the guide frame 29 of the support frame unit 13 can be moved downward from the lock position in FIG. 19A within a vertical range of the length of the movable-side slit 63. Owing to that the engaging member 81 is moved downward within the range of the fixed-side slit 62 in the above state to release engagement between the upper engaging projection 83 and the upper end of the fixed-side slit 62, the regulating member 81 can be removed as being pulled out from both the slits 63, 62. Thus, the locked state of the support frame unit 13 with respect to the fixed frame unit 12 is released.

Figure 20A:
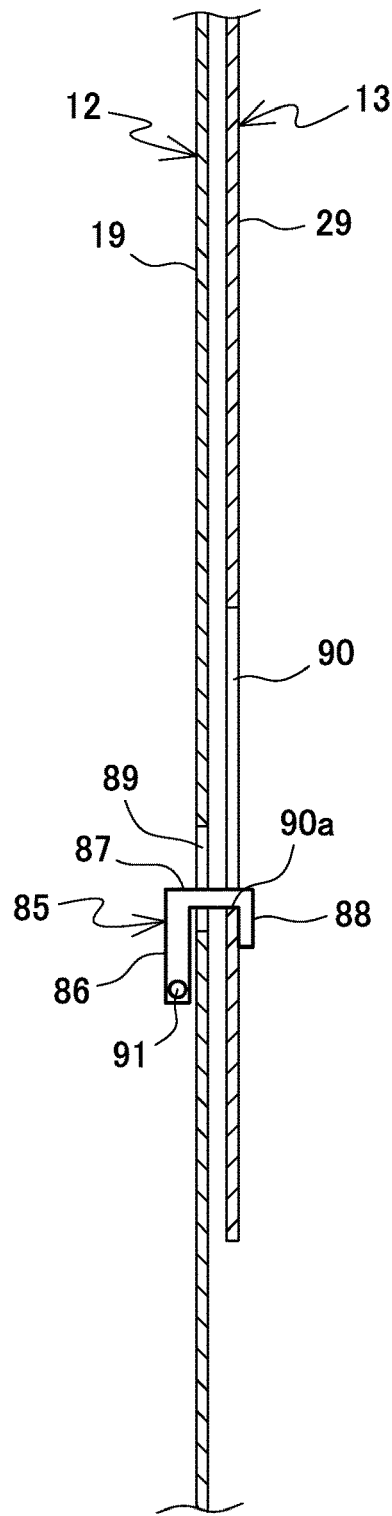
FIGS. 20A and 20B are cross-sectional views, being similar to FIGS. 16 and 17, illustrating a second modified example of the regulating member.
Figure 20B:
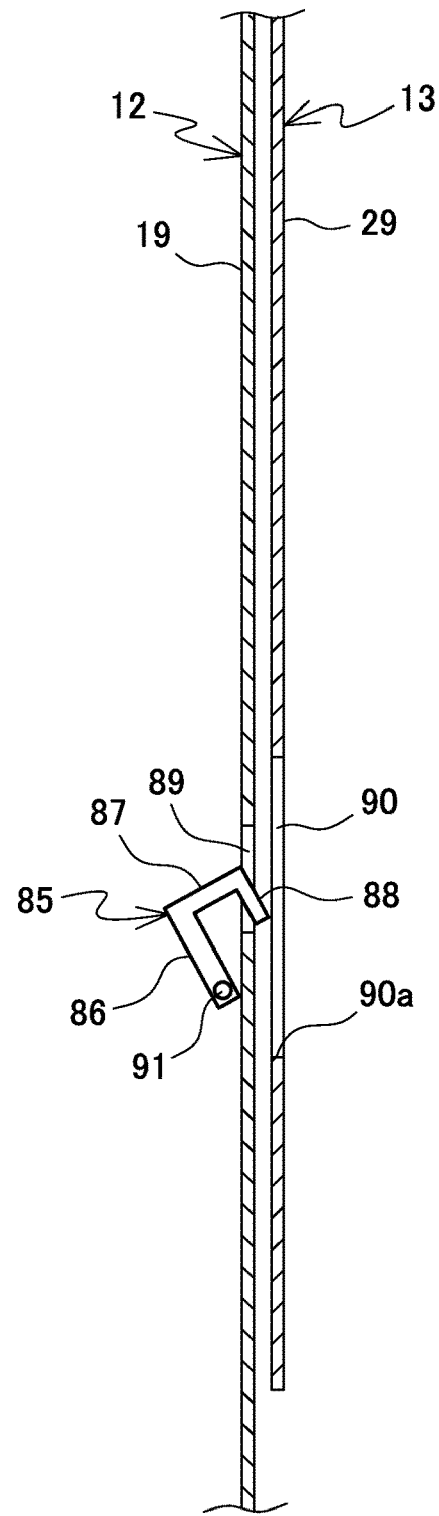

FIGS. 20A and 20B illustrate a regulating member 85 as a second modified example. The regulating member 85 is formed into a U-shape as connecting a base portion 86, an intermediate portion 87, and a leading end engaging portion 88 mutually at right angle. Regarding the regulating member 85, an end of the base portion 86 is attached to the fixed frame unit 12 side in the vicinity of the outer face of the side frame 19 to be rotatable with a shaft 91 so that the leading end engaging portion 88 and the intermediate portion 87 can be inserted from the outside through a fixed-side slit 89 and a movable-side slit 90.

In the locked state of FIG. 20A, the base portion 86 is located along the outer face of the side frame 19, the intermediate portion 87 crosses over the side frame 19 and the guide frame 29 of the support frame unit 13, and the leading end engaging portion 88 is engaged with a movable-side engaging portion 90a at the lower end of a movable-side slit 90. According to the above, upward movement of the support frame unit 13 is restricted with respect to the fixed frame unit 12 and the regulating member 85 cannot be pulled out from both the slits 89, 90.

As illustrated in FIG. 20B, the guide frame 29 of the support frame unit 13 can be moved downward from the lock position in FIG. 20A within a vertical range of the length of the movable-side slit 90. In this state, engagement between the leading end engaging portion 88 and the movable-side engaging portion 90a at the lower end of the movable-side slit 90 is released. Accordingly, the regulating member 85 can be pulled out from both the slits 89, 90 by being rotated outward about the shaft 91. Thus, the locked state of the support frame unit 13 with respect to the fixed frame unit 12 is released.

FIGS. 21A and 21B illustrate a regulating member 92 as a third modified example. The regulating member 92 is formed into a crank-shape as connecting a base portion 93, an intermediate portion 94, and a leading end engaging portion 95 mutually at right angle. Regarding the regulating member 92, an end of the base portion 93 is attached to the fixed frame unit 12 side in the vicinity of the inner face of the guide frame 29 to be rotatable with a shaft 98 so that the leading end engaging portion 95 and the intermediate portion 94 can be inserted from the inner side through a fixed-side slit 96 and a movable-side slit 97.

In the locked state of FIG. 21A, the base portion 93 is located along the inner face of the guide frame 29 of the support frame unit 13, the lower end of the intermediate portion 94 is engaged with a movable-side engaging portion 99 at the lower end of the movable-side slit 97 while the intermediate portion 94 crosses over the side frame 19 and the guide frame 29, and the leading end engaging portion 95 is engaged with a fixed-side engaging portion 100 at the upper end of the fixed-side slit 96. According to the above, upward movement of the support frame unit 13 is restricted with respect to the fixed frame unit 12 and the regulating member 92 cannot be pulled out from both the slits 96, 97.

As illustrated in FIG. 21B, the guide frame 29 of the support frame unit 13 can be moved downward from the lock position in FIG. 21A within a vertical range of the length of the movable-side slit 97. In this state, engagement between the leading end engaging portion 95 and the fixed-side engaging portion 100 at the upper end of the fixed-side slit 96 is released. Accordingly, the regulating member 92 can be pulled out from both the slits 96, 97 by being rotated inward about the shaft 98. Thus, the locked state of the support frame unit 13 with respect to the fixed frame unit 12 is released.

The regulating device 60 can be modified or varied variously without substantially changing the technical idea. FIGS. 22A, 22B, 23A, and 23B illustrate a regulating device 101 as a first modified example. The regulating device 101 includes a regulating member 102 that is rectangular plate-shaped, a fixed-side engaging groove 103 that is formed at the rear face of the side frame 19 of the fixed frame unit 12 with one side opened along one side of the side frame 19, and a movable-side engaging groove 104 that is formed at the rear face of the guide frame 29 of the support frame unit 13 with one side located at the same side as the fixed-side engaging groove 103 opened similarly along one side of the guide frame 29.

At the upper end of the fixed-side engaging groove 103, an engaging projection 105 is arranged downward from an open end portion thereof. The fixed-side engaging groove 103 and the movable-side engaging groove 104 are arranged at positions to be overlapped in the horizontal direction as viewing from the rear face side of the fixed frame unit 12.

In a state that the fixed-side engaging groove 103 and the movable-side engaging groove 104 are overlapped in height after the support frame unit 13 is pushed down, the regulating member 102 is inserted to both the grooves 103, 104 through open side portions from sides of the side frame 19 and the guide frame 29.

In the locked state illustrated in FIGS. 22A and 23A, since the guide frame 29 is continuously urged upward by the first spring 14, the movable-side engaging portion 106 at the lower end of the movable-side engaging groove 104 is contacted to the lower end of the regulating member 102 to push the regulating member 102 upward. Then, the regulating member 102 is engaged with the fixed-side engaging portion 107 at the upper end of the fixed-side engaging groove 103 with the upper end of the regulating member 102 pressed thereto. Thus, upward movement of the support frame unit 13 is restricted with respect to the fixed frame unit 12.

Here, the regulating member 102 is arranged as being located at the inner side from the engaging projection 105. Accordingly, the regulating member 102 cannot be pulled out from the open side portions of the fixed-side engaging groove 103 and the movable-side engaging groove 104.

As illustrated in FIGS. 22B and 23B, the guide frame 29 of the support frame unit 13 can be moved downward from the lock position in FIGS. 22A and 23A within a vertical range of the length of the movable-side engaging groove 104. Owing to that the regulating member 102 is moved downward below the engaging projection 105 in the above state, the regulating member 102 can be pulled out laterally through both the engaging grooves 103, 104. Thus, the locked state of the support frame unit 13 with respect to the fixed frame unit 12 is released.

Figure 24:
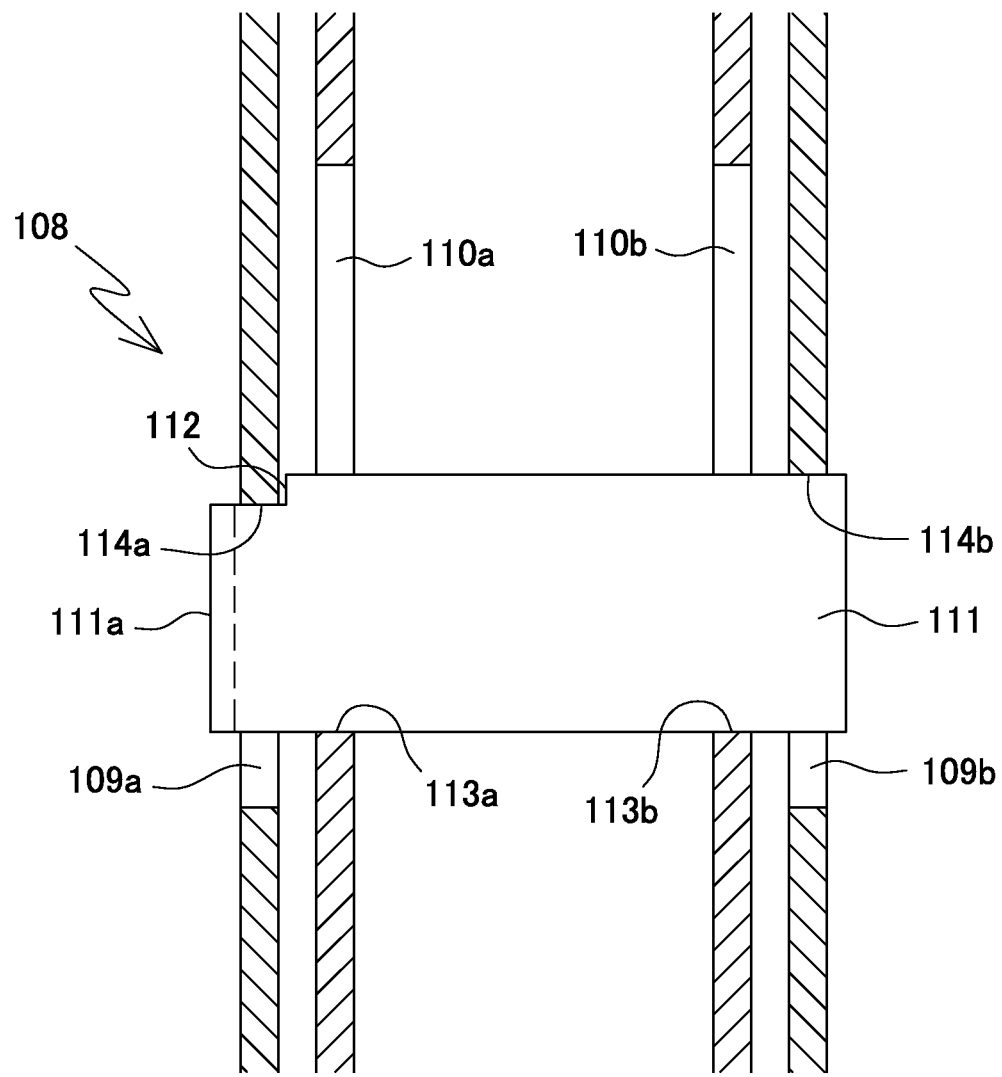
FIG. 24 is a cross-sectional view, being similar to FIG. 16, illustrating a second modified example of the regulating device.

FIG. 24 illustrates a regulating device 108 as a second modified example. Regarding the regulating device 108, a fixed-side slit 109a being similar to the fixed-side slit 62 in FIG. 16 is formed at the rear face of the side frame 19 of the fixed frame unit 12 and a fixed-side slit 109b is formed as well at the front face of the side frame 19. The fixed-side slit 109b at the front face side is formed so that the upper end thereof is located slightly higher than the fixed-side slit 109a at the rear face side. Similarly, movable-side slits 110a, 110b being similar to the movable-side slit 63 in FIG. 16 are formed at the same height at the rear face and the front face of the guide frame 29 of the support frame unit 13.

The regulating device 108 includes a regulating member 111 that is approximately rectangular elongated in the horizontal direction. A cutout 112 is formed at an upper end corner at the rear face side to be matched with height difference between the upper ends of the fixed-side slit 109a and the fixed-side slit 109b. Similarly to the base plate portion 64 of the regulating member 61, a base plate portion 111a is formed as being bent into an L-shape at an end of the regulating member 111 where the cutout 112 is formed. The regulating member 111 is mounted so that the regulating member 111 passes through the fixed-side slits 109a, 109b and the movable-side slits 110a, 110b at once in a state that the slits 109a, 109b, 110a, 110b are aligned in height with the support frame unit 13 pushed down and the base plate portion 111a is contacted to the outer face of the rear face of the side frame 19.

In the locked state illustrated in FIG. 24, since the guide frame 29 of the support frame unit 13 is continuously urged upward by the first spring 14, the movable-side engaging portions 113a, 113b at the lower ends of the movable-side slits 110a, 110b are contacted to the lower end of the regulating member 111 to push the regulating member 111 upward. Then, the regulating member 111 is engaged with fixed-side engaging portions 114a, 114b at the upper ends of the fixed-side slits 109a, 109b with the upper end of the regulating member 111 pressed thereto. Thus, upward movement of the support frame unit 13 is restricted with respect to the fixed frame unit 12.

Here, the regulating member 111 is arranged as being located at a position so that the cutout 112 is aligned with the fixed-side slit 109a at the rear face side. Accordingly, since a side face of the cutout 112 is engaged with an upper end of the fixed-side slit 109a, the regulating member 111 cannot be pulled out from the fixed-side slits 109a, 109b and the movable-side slits 110a, 110b. Further, since the regulating member 111 is engaged between the fixed-side engaging portions 114a, 114b and the movable-side engaging portions 113a, 113b respectively at both the rear face side and the front face side, the regulating member 111 is prevented from being rotated by the urging force of the first spring 14 and the reaction force from the fixed-side engaging portions 114a, 114b.

Further, the object support apparatus 10 of the present embodiment includes a brake mechanism that is capable of holding the support frame unit 13 at a desired height position and moving and stopping the support frame unit 13 easily with a simple operation even when a force caused by vibration, impact or the like is applied from the outside. The brake mechanism includes a brake device 35 at the support frame unit 13 and a first brake rail 21 at the fixed frame unit 12. The brake device 35 can be operated or released via a transmission rod 55 owing to that the handle bar 57 of the operational handle portion 15 is operated.

In the above embodiment, the cam grooves 38, 39 are arranged as being extended horizontally in the lower frame 32. In another embodiment, it is also possible that the cam grooves are arranged obliquely, that is, in an intersecting direction not to be perpendicular to a movement direction of the support frame unit 13 as the movable support unit in accordance with a structure, a use, and design conditions of a support mechanism.

Further, the first movable cam face and the second movable cam face at each of the cam grooves 38, 39 are not necessarily arranged in parallel. It is simply required to be arranged that the first movable cam face and the second movable cam face are oriented to be mutually opposed, one of the movable cam faces is contacted to the cam follower member, and a load and a spring force of the first spring can be transmitted therebetween.

In the above, description is provided on preferable embodiments of the present invention. Here, not limited to the abovementioned embodiments, the present invention may be actualized with various modifications or variations without departing from the technical scope thereof. For example, the regulating member may be formed into various shapes other than those described in the abovementioned embodiments. The engaging portion at the fixed frame unit 12 side and the engaging portion at the support frame unit 13 side are not limited to be formed as slits or grooves described in the abovementioned embodiments.

This application claims the priority benefit of Japanese Patent Application No. 2014-103704 hereby incorporated by reference.

What is claimed is:

1. A load support apparatus, comprising:
a fixed support unit;
a fixed-side slit provided in the fixed support unit and extending in a predetermined direction;
a movable support unit for receiving a load, being movable with respect to the fixed support unit in a predetermined range along the predetermined direction;
a movable-side slit provided in the movable support unit and extending in the predetermined direction;
a fixed cam that is arranged at the fixed support unit, having a fixed cam face;
a cam groove that is arranged at the movable support unit and extended in a direction intersecting with a movement direction of the movable support unit, having a first movable cam face and a second movable cam face opposed to each other;
a cam follower that is movable in the cam groove along the cam groove, being contacted to the first movable cam face or the second movable cam face;
a first spring that is arranged between the fixed support unit and the movable support unit so as to support the load;
a second spring that urges the cam follower to the fixed cam face; and
a regulating member in a shape of a plate, that is detachably interposed between the fixed-side slit and the movable-side slit, regulates movement of the movable support unit with respect to the fixed support unit and extends in the predetermined direction,
wherein a reaction force from the fixed cam face to the cam follower includes a component in a first direction along the movement direction of the movable support unit and a component in a second direction at least perpendicular to the movement direction of the movable support unit, the components occurring depending on a position in the predetermined range where the movable support unit is movable,
the fixed cam face has a cam shape so that a load acting around the cam follower, an urging force of the first spring, a reaction force from the fixed cam face to the cam follower, and an urging force of the second spring are balanced around the cam follower in the predetermined range where the movable support unit is movable,
the fixed-side slit includes a fixed-side engaging portion engaging the regulating member at one end in the predetermined direction,
the movable-side slit includes a movable-side engaging portion engaging the regulating member at another end opposite to the one end in the predetermined direction, and
in a state that the load is not supported by the movable support unit, the regulating member is engaged with the movable-side engaging portion and engaged with the fixed-side engaging portion with the urging force of the first spring, and the regulating member is locked between the fixed-side engaging portion and the movable-side engaging portion with the urging force received from the movable-side engaging portion and a reaction force received from the fixed-side engaging portion.

2. The load support apparatus according to claim 1, wherein the regulating member includes a first projection that is engaged with the fixed support unit and/or the movable support unit in a pull-out direction of the regulating member in a state of being locked between the fixed-side engaging portion and the movable-side engaging portion.

3. The load support apparatus according to claim 2, wherein the regulating member further includes a second projection that is engaged with the fixed support unit and/or the movable support unit in a direction in which the regulating member is to be rotated with the urging force received from the movable-side engaging portion and the reaction force received from the fixed-side engaging portion.

4. The load support apparatus according to claim 3, wherein the first projection and the second projection of the regulating member prevent the regulating member from being pulled out and rotating with the urging force received from the movable-side engaging portion and the reaction force received from the fixed-side engaging portion.

5. The load support apparatus according to claim 1, wherein the movable support unit is movable against the urging force in a direction to release locking between the regulating member and the movable-side engaging portion.

* * * * *